US009429432B2

(12) United States Patent
McClernon et al.

(10) Patent No.: US 9,429,432 B2
(45) Date of Patent: Aug. 30, 2016

(54) SYSTEMS AND METHODS FOR DEFINING A GEOGRAPHIC POSITION OF AN OBJECT OR EVENT BASED ON A GEOGRAPHIC POSITION OF A COMPUTING DEVICE AND A USER GESTURE

(71) Applicant: Duke University, Durham, NC (US)

(72) Inventors: Francis J. McClernon, Durham, NC (US); Romit Roy Choudhury, Durham, NC (US)

(73) Assignee: Duke University, Durham, NC (US)

( * ) Notice: Subject to any disclaimer, the term of this patent is extended or adjusted under 35 U.S.C. 154(b) by 0 days.

(21) Appl. No.: 14/286,614

(22) Filed: May 23, 2014

(65) Prior Publication Data

US 2014/0365111 A1    Dec. 11, 2014

Related U.S. Application Data

(60) Provisional application No. 61/831,878, filed on Jun. 6, 2013.

(51) Int. Cl.
| | | |
|---|---|---|
| *G01C 21/20* | (2006.01) | |
| *H04W 64/00* | (2009.01) | |
| *G01S 5/02* | (2010.01) | |
| *G01C 21/34* | (2006.01) | |

(52) U.S. Cl.
CPC ............ *G01C 21/20* (2013.01); *G01S 5/0284* (2013.01); *H04W 64/00* (2013.01); *G01C 21/3461* (2013.01)

(58) Field of Classification Search
CPC ...................................................... G01C 21/20
USPC ........................................................... 701/409
See application file for complete search history.

(56) References Cited

U.S. PATENT DOCUMENTS

| | | | | |
|---|---|---|---|---|
| 6,122,520 | A * | 9/2000 | Want et al. | 455/456.2 |
| 6,564,144 | B1* | 5/2003 | Cherveny | 701/461 |
| 8,831,636 | B2* | 9/2014 | Kim et al. | 455/456.2 |
| 2006/0256007 | A1* | 11/2006 | Rosenberg | 342/357.08 |
| 2009/0054067 | A1* | 2/2009 | Gauthier et al. | 455/440 |
| 2009/0319181 | A1* | 12/2009 | Khosravy et al. | 701/208 |
| 2012/0058783 | A1* | 3/2012 | Kim et al. | 455/456.2 |
| 2012/0059846 | A1* | 3/2012 | Sung | G06F 17/30241 707/769 |

OTHER PUBLICATIONS

Flood fill, Wikipedia article, Aug. 31, 2015, URL: https://en.wikipedia.org/wiki/Flood_fill.
Ray casting, Wikipedia article, Aug. 31, 2015, URL: https://en.wikipedia.org/wiki/Ray_casting.
Akyildiz et al., A Survey on Sensor Networks, IEEE Communications Magazine, IEEE, Aug. 2002.

(Continued)

*Primary Examiner* — Behrang Badii
*Assistant Examiner* — Michael Berns
(74) *Attorney, Agent, or Firm* — Olive Law Group, PLLC

(57) ABSTRACT

Systems and methods for computing a geographic position of an object or event based on a geographic position of a computing device and a user gesture are disclosed herein. According to an aspect, a method includes determining a geographic position of a computing device. The method also includes receiving a user gesture on the computing device to indicate a direction towards a location from the computing device. Further, the method includes defining a geographic position of the location based on the geographic position of the computing device and the user gesture.

33 Claims, 11 Drawing Sheets

(56) References Cited

OTHER PUBLICATIONS

Azizyan et al., SurroundSense: Mobile Phone Localization via Ambience Fingerprinting, MobiCom '09, Sep. 20-25, 2009, Beijing, China.

Dobkin et al., Fast Detection of Polyhedral Intersection, Theoretical Computer Science 27 (1983), Elsevier Science Publishers B.V., pp. 241-253.

Kleinberg, Jon M., Authoritative Sources in a Hyperlinked Environment, Journal of the ACM, vol. 46, No. 5, pp. 604-632, Sep. 1999.

Lee et al., Cigarette butts near building entrances: what is the impact of smoke-free college campus policies?, Tobacco Control 2013, 22: pp. 107-112, Dec. 1, 2011.

* cited by examiner

- Estimated by line segment intersection
- Estimated by trapezoid intersection
- True event location Line segment
Trapezoid

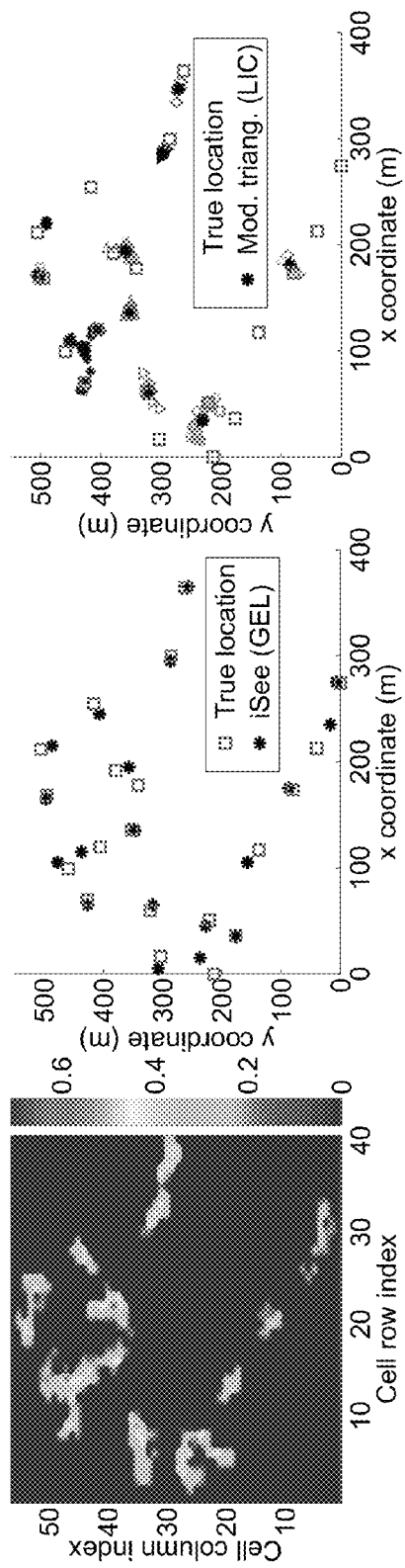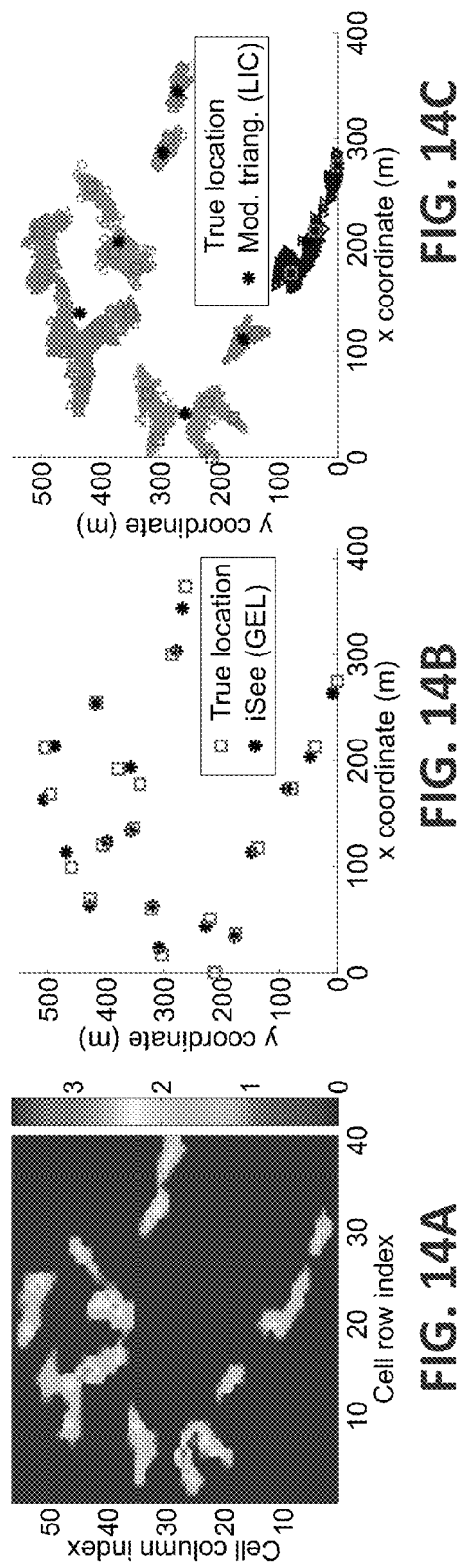

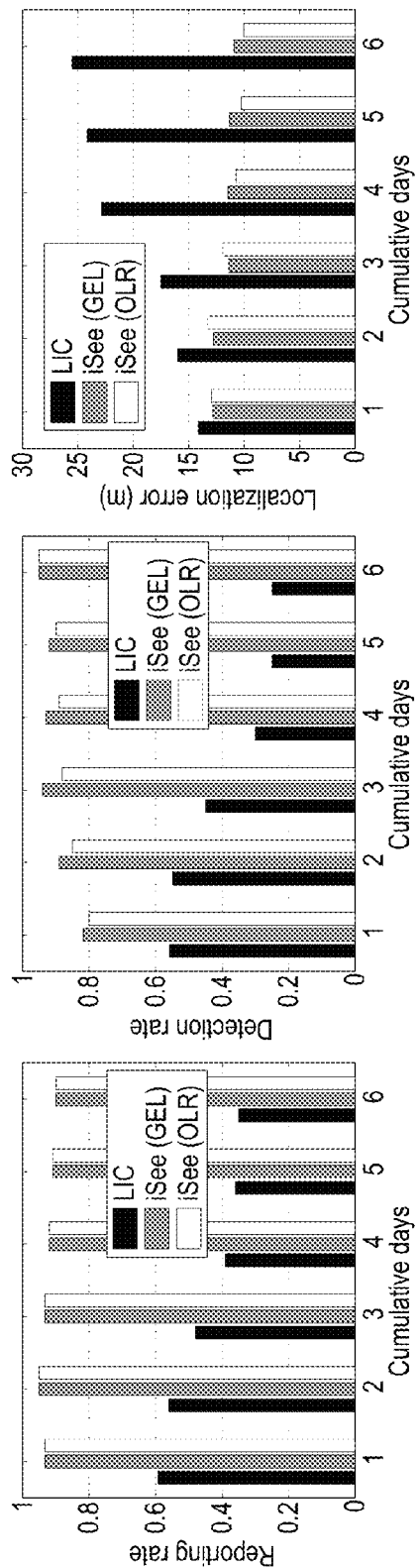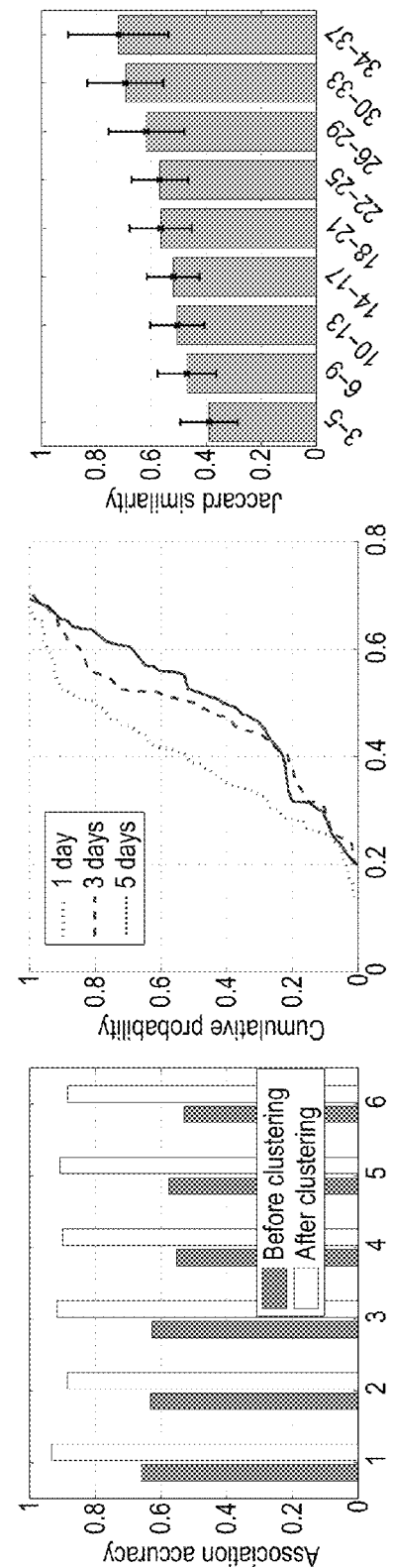

SYSTEMS AND METHODS FOR DEFINING A GEOGRAPHIC POSITION OF AN OBJECT OR EVENT BASED ON A GEOGRAPHIC POSITION OF A COMPUTING DEVICE AND A USER GESTURE

CROSS REFERENCE TO RELATED APPLICATION

This application claims the benefit of U.S. Provisional Patent Application No. 61/831,878, filed Jun. 6, 2013 and titled SYSTEMS AND METHODS FOR THE LOCALIZATION OF REAL WORLD OBJECTS, EVENTS AND BEHAVIORS, the disclosure of which is incorporated herein by reference in its entirety.

TECHNICAL FIELD

The presently disclosed subject matter relates to mapping. Particularly, the presently disclosed subject matter relates to systems and methods for defining a geographic position of an object or event based on a geographic position of a computing device and a user gesture.

BACKGROUND

Many desktop and mobile computing devices are now configured to provide web mapping applications. Such applications can offer satellite imagery, street maps, and street view perspectives, as well as functions such as route planning. In addition, web mapping applications can provide information about real world features shown on a map presented by the application. For example, the application can be used to provide contact information and business hours for retail stores shown on a map. Mobile computing devices, such as smartphones, typically include a global positioning system (GPS) receiver for navigation and for displaying a position of the device on the map.

Localization or positioning of real world features can be very expensive for companies or institutions to acquire. Various techniques are currently available for mapping or defining a geographic position of real world objects or events at a gross level. For example, geotagging has been used for adding geographic identification metadata to various media such as a geotagged photograph or video, websites, SMS messages, QR codes, or RSS feeds. However, current techniques and systems for localizing relatively small or time varying events have resulted in poor spatial accuracy. Accordingly, there is a need to provide improved systems and techniques for defining the geographic position of locations, particularly those that are relatively small or time varying.

In addition, searching for information about features in a user's environment can be very time-consuming for users. As an example, searching for information over the Internet on a mobile computing device requires the user to enter text information into a text browser on a web browser. Searches that are map-based require that the user read locations on the map and indicate which features are of interest. Accordingly, there is a need to provide improved systems and techniques for defining the geographic position of locations in a user's vicinity by quick and efficient means.

BRIEF SUMMARY

Disclosed herein are systems and methods for defining a geographic position of an object or event based on a geographic position of a computing device and a user gesture. According to an aspect, a method includes determining a geographic position of a computing device. The method also includes receiving a user gesture on the computing device to indicate a direction towards a location from the computing device. Further, the method includes defining a geographic position of the location based on the geographic position of the computing device and the user gesture.

According to another aspect, a method includes receiving, from each of multiple computing devices, data comprising a geographic position of the respective computing device and a user gesture input to indicate a direction towards a location from the respective computing device. The method also includes determining a geographic position of the location based on the data from each of the computing devices.

BRIEF DESCRIPTION OF THE SEVERAL VIEWS OF THE DRAWINGS

The foregoing aspects and other features of the present subject matter are explained in the following description, taken in connection with the accompanying drawings, wherein:

FIGS. 13A-13C show examples when there are, on average, 5.5 swipes per event location;

FIGS. 14A-14C show examples when there are many more swipes (on average 34.1) per event location;

FIGS. 15A-15C show the average localization results when the swipes are cumulated over days;

FIG. 16A plots the association accuracy before and after temporal clustering for cumulative days;

FIG. 16B shows the cumulative distribution of the Jaccard similarity between the estimated and true event occurrence interval; and FIG. 16C plots the mean and standard deviation (STD) of Jaccard similarity versus the number of swipes per hotspot.

DETAILED DESCRIPTION

Figure 1:
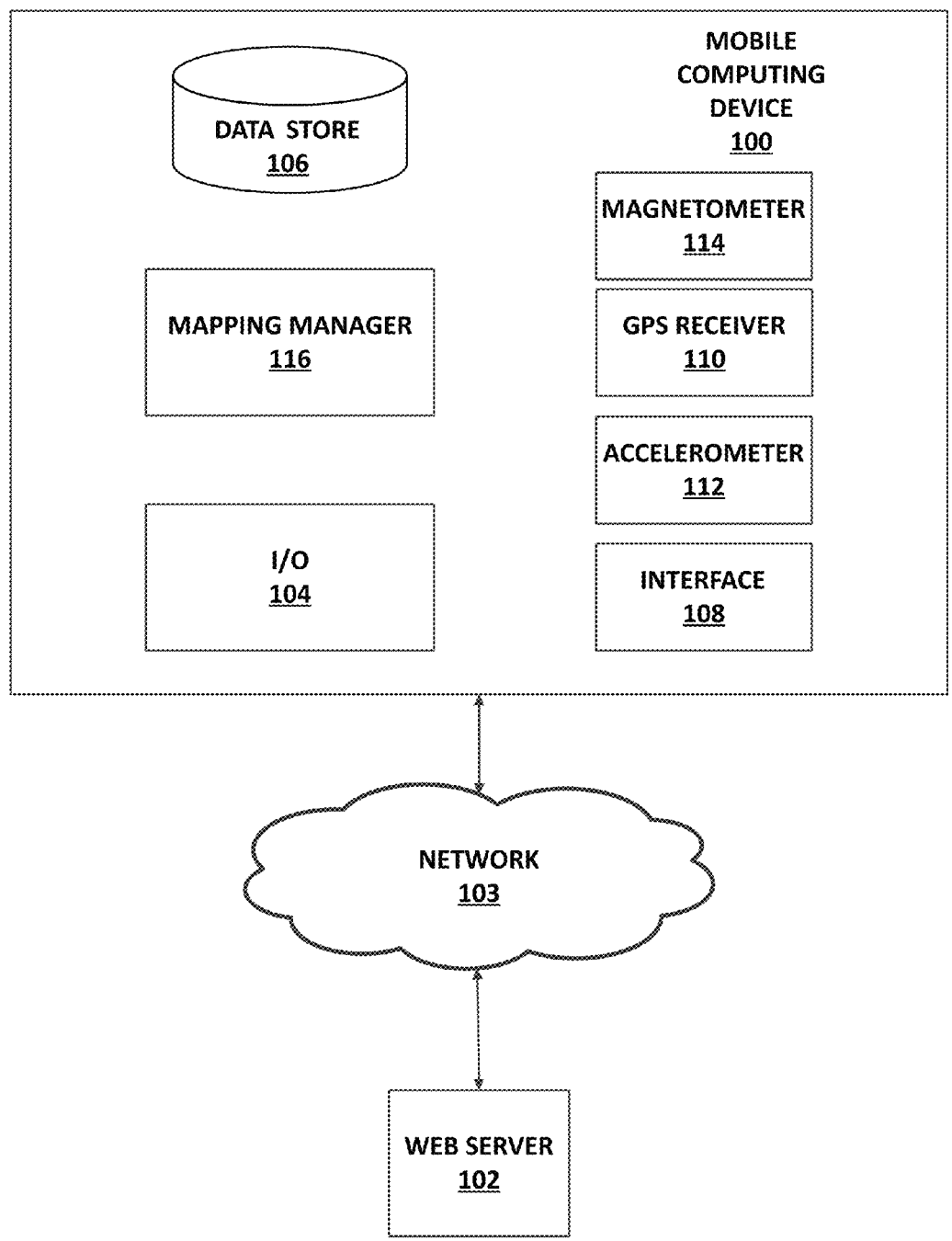
FIG. 1 is a block diagram of a system for defining a geographic position of a location based on a geographic position of a computing device and a user gesture in accordance with embodiments of the present disclosure.

For the purposes of promoting an understanding of the principles of the present disclosure, reference will now be made to various embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e. at least one) of the grammatical object of the article. By way of example, "an element" means at least one element and can include more than one element.

Unless otherwise defined, all technical terms used herein have the same meaning as commonly understood by one of ordinary skill in the art to which this disclosure belongs.

Embodiments of the present disclosure enable a computing device to determine a geographic position of a computing device, to receive a user gesture on the computing device to indicate a direction towards a location from the computing device, and to define a geographic position of the location based on the geographic position of the computing device and the user gesture. For example, the computing device may use a GPS receiver to obtain satellite positioning coordinates for determining the geographic position of the computing device. Further, for example, the computing device may include a touchscreen display that can receive a swipe made by the user for indicating a direction towards an object or event of interest. The computing device may determine its heading or orientation and determine the direction towards the location based on its orientation and the direction of the swipe. The computing device may define a geographic position of the location of interest based on the geographic position of the computing device when the swipe was made, the orientation of the computing device, and the direction of the swipe. A geographic map including the location may be maintained at the computing device or another computing device. Further, an address of the location may be specified based on the geographic position of the computing device and the user gesture. Example user gestures include, but are not limited to, a finger swipe on a computing device touchscreen display (e.g., a smartphone display), a pointing-like gesture towards a object or event, a photo taken of the object, and the like.

As referred to herein, the term "computing device" should be broadly construed. It can include any type of mobile device, for example, a smart phone, a cell phone, a pager, a personal digital assistant (PDA, e.g., with GPRS NIC), a mobile computer with a smart phone client, a smart watch, or the like. A computing device can also include any type of conventional computer, for example, a desktop computer, a laptop computer, a netbook computer, a notebook computer, or the like. A typical mobile device is a wireless data access-enabled device (e.g., an iPHONE® smart phone, a BLACKBERRY® smart phone, a NEXUS ONE™ smart phone, an iPAD™ device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers (which are web browsers with small file sizes that can accommodate the reduced memory constraints of wireless networks), on other client applications accessed via the graphical displays, on client applications that do not utilize a graphical display, or the like. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on a mobile device, the examples may similarly be implemented on any suitable computing device. In another example, a computing device may be a smart watch or other device configured to gather data input by a user in accordance with the present disclosure, and to transmit to another mobile computing device (e.g., smartphone) that in turn communicates the data to a wireless network.

As referred to herein, an "interface" is generally a system by which users interact with a computing device. An interface can include an input for allowing users to manipulate a computing device, and can include an output for allowing the system to present information and/or data, indicate the effects of the user's manipulation, etc. An example of an interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. The display object can be displayed on a display screen of a mobile device and can be selected by, and interacted with by, a user using the interface. In an example, the display of the mobile device can be a touchscreen display, which can display the display icon. Further, for example, users can touch the touchscreen display upon which the user can make gestures, such as a swipe. The user can depress the area of the display screen at which the display icon is displayed for selecting the display icon. In another example, the user can use any other suitable interface of a mobile device, such as a keypad, to select the display icon or display object. For example, the user can use a track ball or arrow keys for moving a cursor to highlight and select the display object.

Operating environments in which embodiments of the present disclosure may be implemented are also well-known. In a representative embodiment, a computing device, such as a mobile device, is connectable (for example, via WAP) to a transmission functionality that varies depending on implementation. Thus, for example, where the operating environment is a wide area wireless network (e.g., a 2.5G network, a 3G network, or a 4G network), the transmission functionality comprises one or more components such as a mobile switching center (MSC) (an enhanced ISDN switch that is responsible for call handling of mobile subscribers), a visitor location register (VLR) (an intelligent database that stores on a temporary basis data required to handle calls set up or received by mobile devices registered with the VLR), a home location register (HLR) (an intelligent database responsible for management of each subscriber's records), one or more base stations (which provide radio coverage with a cell), a base station controller (BSC) (a switch that acts as a local concentrator of traffic and provides local switching to effect handover between base stations), and a packet control unit (PCU) (a device that separates data traffic coming from a mobile device). The HLR also controls certain services associated with incoming calls. Of course, the present disclosure may be implemented in other and next-generation mobile networks and devices as well. The mobile device is the physical equipment used by the end user, typically a subscriber to the wireless network. Typically, a mobile device is a 2.5G-compliant device or 3G-compliant device or a 4G-compliant device that includes a subscriber identity module (SIM), which is a smart card that carries subscriber-specific information, mobile equipment (e.g., radio and associated signal processing devices), a user interface (or a man-machine interface (MMI)), and one or more interfaces to external devices (e.g., computers, PDAs, and the like). The mobile device may also include a memory or data store.

The illustrative embodiments of the present disclosure are generally implemented within mobile computing devices that include web mapping applications and positioning functionality. However, as will be appreciated, the present disclosure is applicable to any computing device that is not fixed in position. Such devices may be preprogrammed with map data in a memory, or the map data may be placed into the memory while the device is in operation. For example, map data may be supplied through a communications link from a network, such as the Internet. In an implementation where a cellular telephone comprises the present disclosure, the map information may be received in the form of data packets from the Internet, via the cellular protocol and then stored into the memory of the device.

As referred to herein, a "GPS receiver" may be any equipment or component capable of determining a geographic location. In an example, the GPS receiver may receive satellite signals for use in determining the geographic location. Further, the GPS receiver may output a signal indicating the geographic location, such as coordinates of the geographic location.

As referred to herein, an "accelerometer" may be any equipment or component capable of measuring acceleration. This acceleration may be proper acceleration, the acceleration experienced relative to freefall. For example, an accelerometer may be a single- or multi-axis accelerometer configured to detect magnitude and direction of the acceleration as a vector quantity, and can be used to sense orientation, acceleration, vibration shock, or falling. A micromachined accelerometer may be provided in a computing device, and may output a signal indicating the acceleration measurements.

As referred to herein, a "magnetometer" may be any equipment or component capable of measuring the strength and/or direction of a magnetic field. A magnetometer may be provided on a computing device, such as a mobile device, for indicating direction, for example. The magnetometer may output a signal indicating a direction.

The presently disclosed subject matter is now described in more detail. For example, FIG. 1 illustrates a block diagram of a system for defining a geographic position of a location based on a geographic position of a computing device and a user gesture. Referring to FIG. 1, the system includes a mobile computing device 100 having a number of functional components. This representation of the mobile computing device 100 is meant to be for convenience of illustration and description, and it should not be taken to limit the scope of the present disclosure as one or more of the functions may be combined. Typically, these components are implemented in software (as a set of process-executable computer instructions, associated data structures, and the like). One or more of the functions may be combined or otherwise implemented in any suitable manner (e.g., in hardware, in firmware, in combined hardware and software, or the like). The mobile computing device 100 may include a graphics rendering engine for displaying information to the end user in the usual manner. The mobile device 100 is Internet-accessible and can interact with a web server 102 via a network 103 using known Internet protocols such as HTTP, HTTPS, and the like. The web server 102 is shown as a single device but this is not a requirement; one or more programs, processes, or other code may comprise the server and be executed on one or more machines (in one or more networked locations).

The mobile computing device 100 may communicate with various components of the system using suitable network components, such as, but not limited to, a base station, an MSC, PSTN, and various other network components, which are not shown herein for ease of illustration. A wireless input/output (I/O) component 104 or any other suitable communication interface may be used for communicating data to other devices and for receiving communication data from other devices via a network as will be understood to those of skill in the art. The mobile device 100 may include an antenna for wirelessly sending and receiving communications to the base station or any other suitable communications unit. Geographic location information and any other information described herein in accordance with embodiments of the present disclosure may be stored in a data store 106, which can be any suitable type of memory. The user may use an interface 108 of the mobile device 100 for interacting with the mobile device 100. For example, the interface 108 may include a touchscreen display.

The operation of the system can be described by the following example. As shown in FIG. 1, the mobile computing device 100 includes various functional components and an associated data store to facilitate the operation. The operation of the disclosed methods may be implemented using system components other than as shown in FIG. 1.

In this example system, the mobile computing device 100 may include a number of components for determining its position, orientation, and movement. Particularly, the mobile computing device 100 may include a GPS receiver 110 (or other type of a satellite navigation), one or more accelerometers 112, one or more magnetometers 114, suitable hardware, suitable firmware, suitable software, or combinations thereof configured to detect a position, orientation, or movement of the mobile device 100. These components may communicate signals to a mapping manager 116 for indicating the detected positions, orientations, and movements. The mapping manager 116 may include, for example, hardware, firmware, software, or combinations thereof configured to receive the signals for use in accordance with the present disclosure.

It is noted that although a GPS receiver is utilized in the examples provided herein, it should be understood that any other suitable component or technique may be utilized for determining a position of a mobile computing device. For example, in an indoor environment, a local positioning system may provide information to a computing device such that the computing device may determine its position. For example, a geographic position of a computing device may be determined using any satellite position system, a smartphone sensor, a wireless communication system (e.g., WIFI®), a cellular system, and/or radio frequency (RF) signals.

Figure 2:
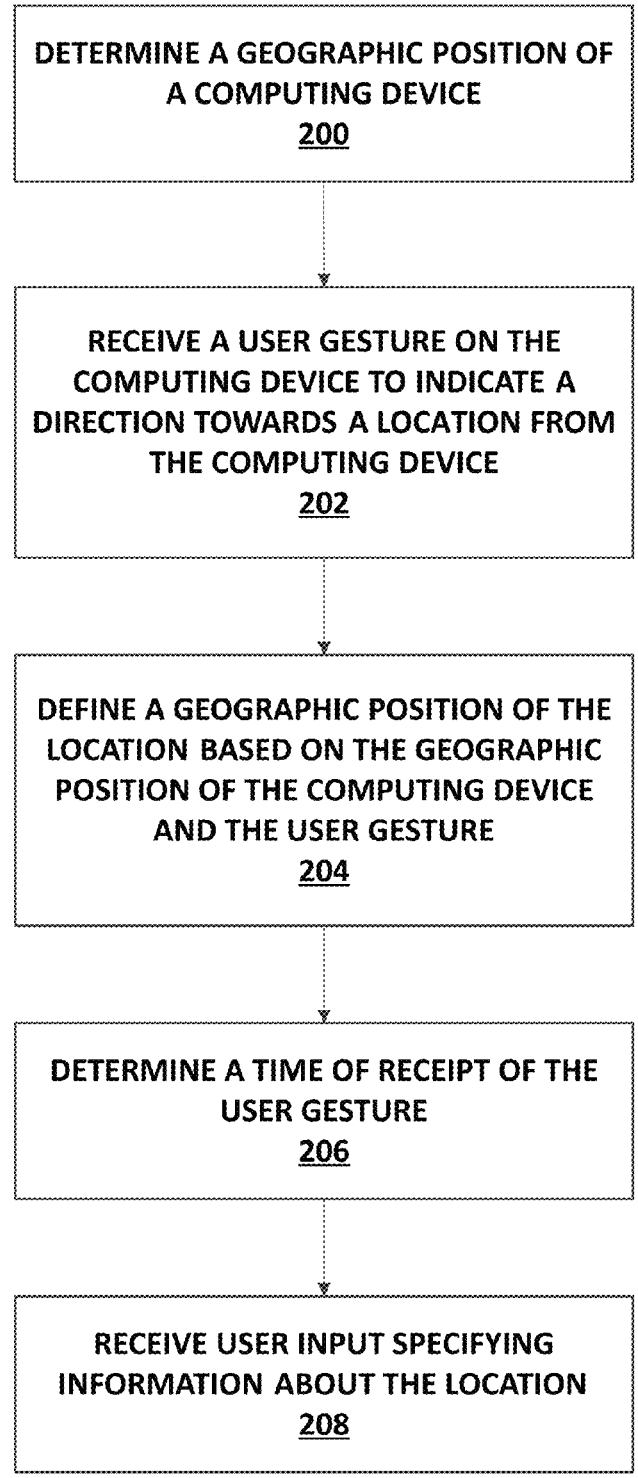
FIG. 2 is a flowchart of an exemplary method for defining a geographic position of a location based on a geographic position of a computing device and a user gesture in accordance with embodiments of the present disclosure.

FIG. 2 illustrates a flowchart of an exemplary method for defining a geographic position of a location based on a geographic position of a computing device and a user gesture. In this example, reference is made to the system shown in FIG. 1 for purposes of illustration; however, reference to this system should not be construed as limiting, and it should be appreciated that the method may be implemented by any suitable system.

Referring to FIG. 2, the method includes determining 200 a geographic position of a computing device. For example, the GPS receiver 110 of the computing device 100 shown in FIG. 1 may determine coordinates of the geographic position of the computing device 100. The GPS receiver 110 may receive and use satellite positioning coordinates received from satellites for determining the geographic position. The GPS receiver 100 may periodically or upon request communicate the coordinates to the mapping manager 116. As an example, the mapping manager 116 may request current coordinates from the GPS receiver 100 for determining the geographic position of the computing device 100.

The method of FIG. 2 includes receiving 202 a user gesture on the computing device to indicate a direction towards a location from the computing device. Continuing the aforementioned example, the mapping manager 116 of the computing device 100 may implement an application for use in defining a geographic position of a location. The computing device 100 may be configured to suitably load the application for interaction by the user. As an example, a touchscreen display of the interface 108 may be used for interacting with the application. To indicate a direction towards a location of interest, the entirety or a portion of the touchscreen display may be configured for receiving a user gesture on its surface for indicating a direction towards a location of interest. For example, the user may be holding or otherwise carrying the computing device 100 and may be located within sight of a location of interest. The location of interest may be where an object or an event of interest is located. The application may control the touchscreen display to display an interface area for receipt of a user gesture on a surface of the touchscreen display corresponding to the interface area. The user of the computing device 100 may input the user gesture for indicating a direction towards the location of interest from the computing device 100. For example, the user may input a swipe gesture within the interface area, and the swipe gesture may be made to indicate a direction towards the location of interest. Data corresponding to the swipe gesture may be stored in the data store 106. Further, the data may be received by the mapping manager 116.

Example user gestures include, but are not limited to, a finger swipe on the smartphone display, a pointing-like gesture towards the object or event, and a photo taken of the object. In another example, a user gesture may be made by a person wearing an optical head-mounted display system, such as GOOGLE GLASS™. Such a system may infer a location of an object that the user points to.

The method of FIG. 2 includes defining 204 a geographic position of the location based on the geographic position of the computing device and the user gesture. Continuing the aforementioned example, the mapping manager 116 may determine a direction of the swipe with respect to an orientation of the computing device 100. Output of the magnetometer 114 may be used to determine an orientation of the computing device 100. For example, the magnetometer 114 may be configured to determine a direction that the computing device 100 is pointing. For example, the computing device 100 may be pointing east. In this example, the swipe may be in a leftward direction on the touchscreen display. In this example, the mapping manager 116 may determine that the direction of the location of interest is towards the north, because the user indicated leftward of the computing device 100 heading to the east.

The method of FIG. 2 includes determining 206 a time of receipt of the user gesture. For example, the mapping manager 116 may determine a time of receipt of the user gesture, and associate a corresponding timestamp with the defined geographic position.

The method of FIG. 2 includes receiving 208 user input specifying information about the location. Continuing the aforementioned example, the user may use the interface for entering a name of an object or event at the location of interest. The name may be associated with the defined geographic position of the location of interest. Alternatively, the user may input any other type of information for association with the location.

In accordance with embodiments, the user device 100 may communicate to the server 102, or another computing device, information and data associated with the user gesture and the geographic position of the computing device. The server 102 may maintain a geographic map including the location of interest. Further, the server 102 may specify an address of the location based on the geographic position of the computing device and the user gesture. The server 102 may also associate information (e.g., name of an object or event) specified by the user of the computing device 100 for association with the location.

In accordance with embodiments, once the server 102 has determined an address of a location based on the geographic position of the computing device and the user gesture, the server 102 may subsequently perform a lookup in a database based on the determined address. For example, the database may include information associated with the address including a formal description of objects or events at or in the vicinity of the location (e.g., from a Wikipedia entry associated with that location); promotional information associated with products in that location (e.g. coupon for product depicted on a billboard); or history and statistics on previous lookups associated with the location.

It should be understood that the steps of FIG. 2 may be implemented by the computing device 100 in combination with the server 102. For example, step 204 may be implemented by the server 102. For example, the computing device 100 may communicate to the server 102 the determined geographic position of the computing device 100, the received user gesture, and the computing device orientation. The server 102 may use this data for defining the geographic position of the location in accordance with embodiments of the present disclosure. As an example, the server 102 may maintain a database for use in identifying the spatial location of real world objects, events, or behaviors that may be distributed via the Internet to other computing devices.

In accordance with embodiments of the present disclosure, a computing device, such as the computing device 100 shown in FIG. 1, may download an application. The application may be the mapping manager 116 shown in FIG. 1. A user may interact with the application by use of the interface 108. The application may provide instructions for its use. Geographic position data collected in accordance with embodiments of the present disclosure may be communicated to a server, such as the server 102 shown in FIG. 1. Geographic position data about the same location may be aggregated from multiple computing devices. The aggregated data may be used by the server 102 for approximating the location of interest. The approximated geographic position of the location may be provided to computing devices for use in positioning the location in maps used by the computing devices.

Figure 3:
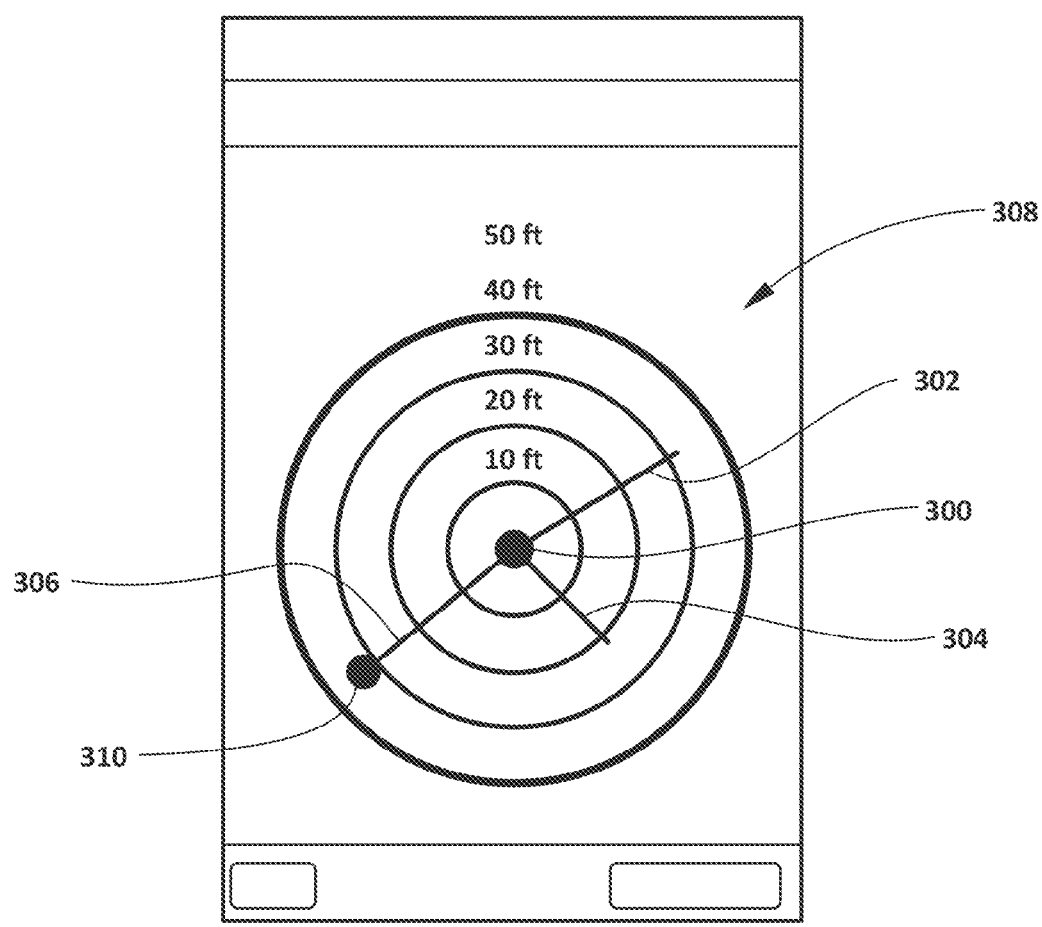
FIG. 3 is a screenshot of a touchscreen display for receipt of a swipe for indicating a direction towards a location of interest in accordance with embodiments of the present disclosure.

FIG. 3 illustrates a screenshot of a touchscreen display for receipt of a swipe for indicating a direction towards a location of interest in accordance with embodiments of the present disclosure. The dot 300 located in about the center of the screen indicates a location of the user or observer. The area surrounding the dot 300 is representative of the area surrounding the user in the real world. Initially, to enter a swipe for indicating a direction towards the location of interest, the user may orient the screen substantially parallel to the ground and facing upward. Subsequently, the user may make a swipe on the surface of the screen for indicating a direction to the location of interest. Particularly, the user may begin the swipe on the dot 300 or anywhere on the screen and draw a straight line or curved line in a direction towards the location of interest. The swipe may be associated with a current position (e.g., GPS coordinates) of the computing device and a time of entry of the swipe. Further, the user may interact with the computing device to enter information (e.g., name of the object or event) about the location. Subsequently, the computing device may send this collected data to a web server for storage, possible aggregation with other user entries about the location, and/or the retrieval of information associated with the location.

After entry of the swipe, the touchscreen display may display lines to show where the user has indicated the location of interest. For example, lines 302, 304, and 306 indicate directions of different locations of interest relative to the position of the user. It is noted that the user does not need to directly orient the computing device towards a location of interest when making a swipe, because the computing device can determine the real world direction of the swipe based on the orientation of the computing device with respect to the swipe. The orientation of the computing device can be determined by the computing device based on, for example, output of a magnetometer and/or accelerometer.

With continued reference to FIG. 3, in addition to entering a direction towards the location of interest, the user may also enter an estimated distance between the position of the user and the position of the location of interest. For example, the display in FIG. 3 shows multiple concentric circles (generally designated 308) about the dot 300. Each circle represents a distance from the user and is associated with a distance (i.e., 10 feet, 20 feet, 30 feet, 40 feet, and 50 feet). To enter a distance, the user may swipe to draw a line from the dot 300 to the circle or a position between circles that represents the estimated distance. The same swipe may indicate the direction towards the location of interest. Alternatively, the user may enter a swipe to indicate the direction, and separately enter the estimated distance (e.g., text entry of the distance). The estimated distance and other data entered about the location of interest may be communicated to a web server, such as the web server 102 shown in FIG. 1.

In accordance with embodiments, a user may enter information about the dimensions and/or size of an object or event. For example, the user may interact with a user interface to enter a height of an object or event. In an example, the entry may be based on the height of the user (using barometer) or another suitable sensing technique. In another example, the user may input information regarding the height (e.g., an estimate of absolute or relative) to where the user stands.

In another example of indicating a direction and/or distance to a location of interest, a user may input taps onto a touchscreen display for entry of the direction and/or distance. For example, referring to FIG. 3, the user may tap at the location corresponding to dot 310 for entering the line 306. The line 306 represents an entry of that the location of interest is located in a direction from the dot 300 to the dot 310. Further, the entry of line 306 corresponds to a distance of about 33 feet.

Figure 4:
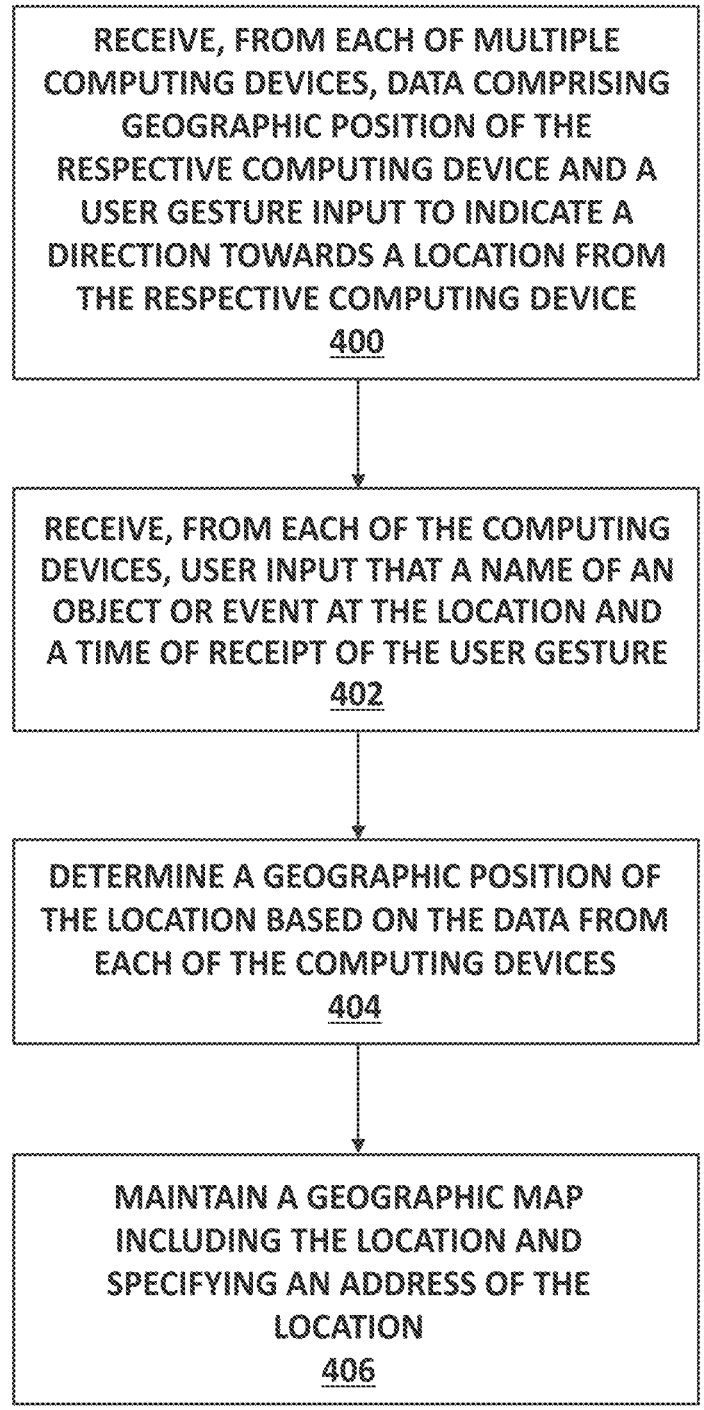
FIG. 4 is a flowchart of an exemplary method for defining a geographic position of a location based on geographic position and user gesture information aggregated from multiple computing devices.

In accordance with embodiments, FIG. 4 illustrates a flowchart of an exemplary method for defining a geographic position of a location based on geographic position and user gesture information aggregated from multiple computing devices. In this example, reference is made to the system shown in FIG. 1 for purposes of illustration; however, reference to this system should not be construed as limiting, and it should be appreciated that the method may be implemented by any suitable system.

Referring to FIG. 4, the method includes receiving 400, from each of multiple computing devices, data comprising geographic position of the respective computing device and a user gesture input to indicate a direction towards a location from the respective computing device. For example, with reference to FIG. 1, the computing device 100 may communicate to the server 102, geographic position and user gesture input to indicate a direction towards a location of interest as described in the method of FIG. 2. For example, the location of interest may be a building or a monument of interest. In addition, one or more other computing devices (not shown in FIG. 1 for simplification of the illustration) may communicate to the server 102 geographic position and user gesture input information about the same location. In this way, the server 102 can receive aggregated position and direction information from multiple computing devices.

The method of FIG. 4 includes receiving 402, from each of the computing devices, user input that a name of an object or event at the location and a time of receipt of the user gesture. Continuing the aforementioned example, the computing devices (i.e., computing device 100 and one or more others in step 400) may send to the server 102 information about the location. For example, the computing devices may send to the server 102 a name of an object or event at the location. In addition, the computing devices may send to the server 102 a timestamp indicating a time when the user gesture was entered.

The method of FIG. 4 includes determining 404 a geographic position of the location based on the data from each of the computing devices. Continuing the aforementioned example, the server 102 may aggregate the geographic position and direction data from the computing devices to estimate or approximate the geographic position of the location. The geographic position and direction data may indicate different locations; however, the server 102 may estimate the location based on the data as described in more detail herein.

The method of FIG. 4 includes maintaining 406 a geographic map including the location and specifying an address of the location. Continuing the aforementioned example, the server 102 may maintain a geographic map including the location and specifying an address of the location. The geographic map and its location and address information may be accessed by computing devices for determining the geographic position of the location. As described in further detail herein, the geographic map may be a topography map.

Example applications of the presently disclosed systems and methods include, but are not limited to, identification and database of spatial location of real world objects or events that are widely distributed. For instance, systems and methods disclosed herein may be utilized to determine the location of all or some places where individuals smoke in public, where streetlights are not functional, where parking space(s) are available, or where a particular species of animal has been observed. These applications may be useful in the areas of community, research, ecology, commercial services, government policy, security and resource allocation, and the like. In addition, maps of the distribution of behaviors that others may want to avoid (e.g., smoking, dark alleys, road construction, accidents, and the like) may be useful in routing oneself through real world environments.

In an example scenario, the method disclosed herein may be implemented by a mobile computing device, such as a smartphone. The mobile computing device may download an application including instructions for implementing the presently disclosed subject matter. The user may interact with the mobile computing device to open the application. The application may be opened when the user observe a target object (e.g., burned out light bulb, locked door, or the like), event (e.g., accident, construction, traffic back up, or the like), person, or target behavior of a person (e.g., smoking, eating, suspicious, or the like). Once the application is opened, a display may appear that presents a central dot or other indicator surrounded by concentric circles or another suitable representation of the observer in a field of view. FIG. 3 provides an example display. The dot or other indicator may represent the user in space. The user may subsequently draw lines with his or her finger(s) or tap locations on the field of view to indicate the direction of the object, event, behavior, or the like and the relative distance to the user. The data entered may be communicated to a server. The data may include, but is not limited to, a current time, the user's location (e.g., longitude and latitude), the heading of the mobile computing device, the angle of the line drawn by the user on the screen, and the relative length of the line. Additional information, such as the type or category or notes on the object, event or behavior observed, may also be entered and communicated to the server.

In another example scenario, data from a large number of computing devices as disclosed herein can be aggregated in such a way as to approximate or estimate the location of one or more targets. For instance, when determining the location of areas where smoking occurs, a large number of observers may localize instances of smoking behavior. Based on this aggregated data, a server or another computing device may generate a topography of smoking likelihood over space and time. For example, the server may generate a likelihood probability map. The maps generated in such embodiments may have many suitable applications. For example, when governments institute smoking bans or changes in policy, crowd-sourced data regarding observed smoking behavior may be used to evaluate the efficacy of such interventions in a relatively quick and inexpensive fashion. A government may also use this information to better target resources (e.g., no smoking signs) and policing. In addition, such maps may be used for personal navigation. For instance, many individuals may willingly avoid locations with a high probability of encountering smoking, such as individuals with asthma or allergies, or individuals who have recently quit smoking. Mobile applications may alert these individuals that they are approaching high-probability smoking areas and provide them with alternative routes that decrease the probability of encountering smoking. Mobile applications may also alert users to the probability that certain events are to occur in a specific location (e.g., food vendor, street performance, or protest), given their occurrence in the past.

In accordance with embodiments, an application on a computing device may be used to crowd source the approximate locations (and temporal patterns) of aversive environmental features (e.g., pollution, noise, trash, and the like) and beneficial environmental features (e.g., water fountains, fruit trees, wheelchair ramps, and the like). Such information may be used by governments and commercial institutions for activities such as resource planning, needs evaluation, and assessment of policy changes.

In another example scenario, an individual may use the systems and methods disclosed herein to point out an object to another user in another location without either person having knowledge of street address, coordinates, or other information typically used to convey location information. In such an application, a user may, for example, point to a streetlight that needs repair and send that information to the utility company. Users may similarly send information about community features that need repair (e.g., sidewalks, signs, and the like) to municipalities without needing to know or provide other location information. In other examples, a wheel chair bound person may use the information to locate handicapped-access to a building and/or parking.

In another example scenario, a user may wish to have information about events or objects in their environment. Rather than conducting a text-based search or take a photograph of the object or event, the user may point out an object using the system and methods disclosed herein. Users may thus point to a building or monument, the location of that object is matched against a known database of objects with similar locations, and the user is provided information from a server. In such way, search for information about real world events or objects can be driven via gesture based searches, thus saving time, particularly when the object is without a known name (e.g. the statue near the building at the corner of $4^{th}$ and State Street).

In accordance with embodiments, a screen display may display the location of indicated objects, events, or behaviors overlaid on a satellite image of the area. Further, the screen display may present a number of occurrences of a behavior (e.g., number of smokers), a smoker location (e.g., latitude and longitude), and a current position of the user (e.g., latitude and longitude).

It is noted that swipes input by users can sometimes be inaccurate. In addition, measurements of magnetometers (or compasses), accelerometers, and other computing device components may be inaccurate. Moreover, swipes may not encode any notion of how far a location of interested is located from the user. Further, the GPS receiver may be inaccurate. Systems and methods disclosed herein may overcome the inaccuracies of user gestures and computing device components. Experimental results of an application on a computing device in accordance with the present disclosure have shown that the application can perform better than established triangulation and clustering-based approaches in terms of accuracy, detection coverage, and robustness to sensor noise.

In accordance with embodiments, the present subject matter discloses a participatory sensing system that can detect and localize events in outdoor public environments. As an example event, consider smoking activity in a university campus. When a user notices a person smoking, she or he may swipe on the smartphone screen in the direction of the event, even during walking or in a vehicle. This gesture on the smartphone requires little burden on the user. Moreover, it allows the user to conveniently indicate any direction of event without turning around. It also uses little memory or computing power. For example, if the user does not intend to reveal that she is reporting on the event, she or he may move to a comfortable location—say when the smoker is behind her—and then swipe backwards. Sensed data from the user's phone, including GPS location, GPS location confidence, compass direction, user-swiped angle and time, are recorded and transmitted to a central server. Using the aggregated data, the smartphone can be used to detect and localize every occurrence of the event. As more data arrive to the server, more events are likely to get detected, while also improving each of their localization accuracies. Timestamps of user-wipes also yield temporal statistics for the events, ultimately offering a spatio-temporal heatmap of the events of interest.

The presently disclosed subject matter can overcome a number of challenges that arise in obtaining location information as described herein. For example, computing device (e.g., smartphone) sensors can be noisy. GPS can lead to location errors of about 10-20 meters in regular operation. The smartphone compass can be affected by variations in the Earth's magnetic field and nearby ferromagnetic material. The user-swiped angle is also subject to human errors. An application residing on the smartphone in accordance with the present disclosure may need to cope with such heavy sensor noise. In another example, user swipes are distributed over space and time, and the smartphone may have no prior knowledge on the correspondence between swipes and event hotspots. In other words, the smartphone application does not know a priori which swipes should be grouped together to calculate an event location. This makes traditional triangulation and optimization-based localization not directly applicable. In another example, the smartphone application should be able to work when only limited swipes are available (i.e., quickly detect events) and also be scalable as more swipes are received.

Systems and methods disclosed herein may address these difficulties by dividing the area of interest into grid cells and representing each user-swipe as a 2D polygon which incorporates GPS and angular errors. Projecting multiple polygons onto the cells results in a cell confidence map. Treating this map as an image, the smartphone application is able to detect hotspots through suitable image processing techniques. By backtracking which swipes cover a detected hotspot and performing temporal clustering, the swipe hotspot correspondence is obtained and the temporal pattern for that hotspot is analyzed. An optimization-based scheme may then be followed to refine the event locations.

In an experiment, the smartphone application was implemented on several different models of ANDROID™ smartphones and distributed to 6 users. 20 red flags were placed on a campus and shuffled over time to represent virtual events. The experiment was performed for 6 days, after which the system was able to detect 95% of the flags with around 10 m of accuracy. Based on these results, it is believed that the smartphone application demonstrates an important step towards a low-cost and near-continuous solution leveraging crowdsourcing for event, behavior, and object reporting and localization.

Figure 5:
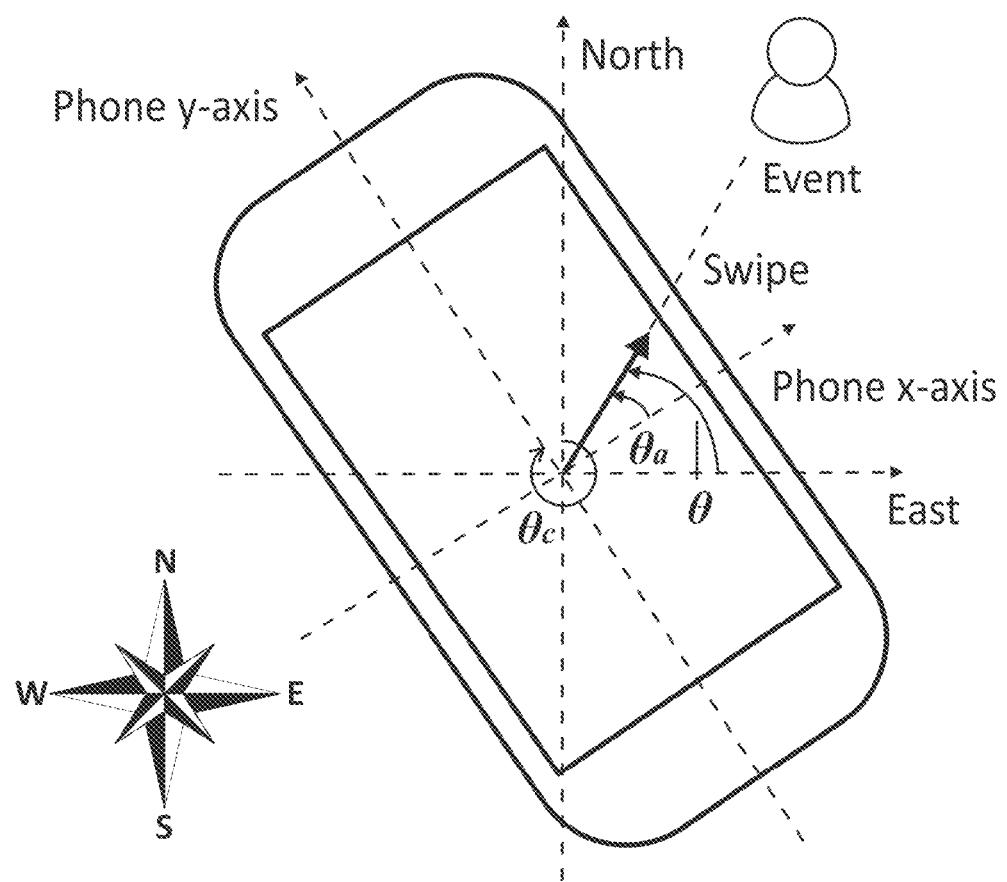
FIG. 5 is a diagram of a smartphone and a user-swiped angle on its display surface.

In accordance with embodiments, various information may be acquired and used for detecting and locating event hotspots. This information includes a user (device) ID u and a time t when a user saw an event (e.g., made the swipe on the smartphone). Additional information includes the user's location l=(x, y) and its accuracy a. They are obtained from the smartphone's GPS. A may be defined as the radius of 68% confidence, i.e., there is a 68% probability that the true location is inside a circle centered at/with radius a. Further information includes the user-swiped angle θ with respect to the east (see FIG. 5, which illustrates a diagram of a smartphone and a user-swiped angle on its display surface). The user-swiped angle θ may be calculated by combining two angles that can be measured by the smartphone: (i) the angle $θ_C$ between the phone's y-axis and the magnetic north which is obtained from the smartphone's compass reading; and (ii) the user-swiped angle $θ_a$ on the touchscreen with respect to the smartphone's x-axis. According to FIG. 5, it can be proven that 8 can be calculated as θ=$θ_a$−$θ_C$) mod 2 II no matter how the phone orientates as long as it is in the horizontal plane. Collectively, we denote a user's swipe as $s_i$={$u_i$, $t_i$, $l_i$, $a_i$, $θ_i$} and the set of all the swipes of interest over a spatial and temporal range (e.g., over the past 3 days at University A) as S={$s_i$} The accelerometer readings were recorded as well (denoted as $acc_x$ and $acc_y$; $acc_z$ is not considered to allow people to make swipes even during walking). A swipe is considered valid only when the following conditions are satisfied while swiping.

abs(mean($acc_k$))≤0.05 g, std($acc_k$)≤0.1 g, k∈{x, y}, where g is the gravity of Earth. Given a data set S contributed by crowds, the smartphone application may be used to answer the following questions: how many distinct event locations were identified by crowds; where were these events; and when did these events happen.

Figure 6:
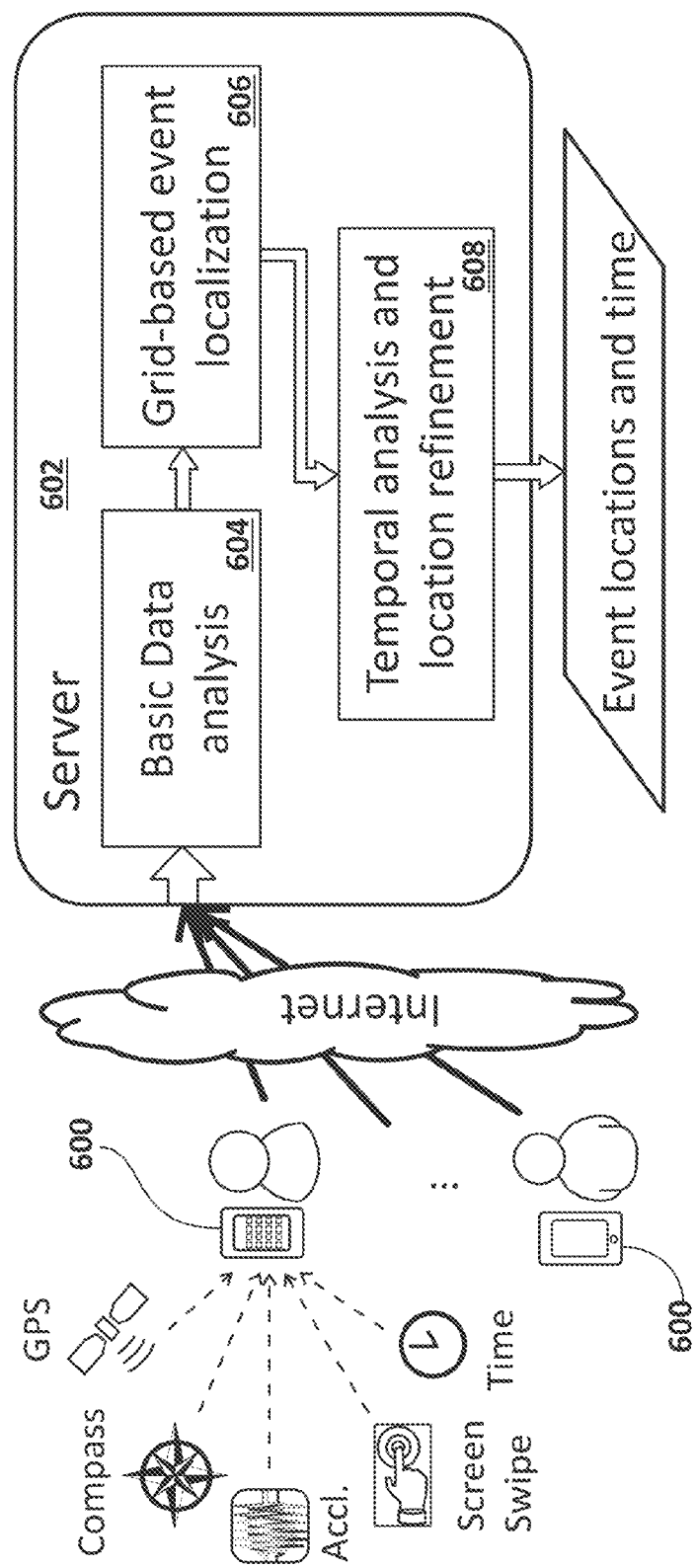
FIG. 6 illustrates a diagram of an example architecture of a system in accordance with embodiments of the present disclosure.

FIG. 6 illustrates a diagram of an example architecture of a system in accordance with embodiments of the present disclosure. Referring to FIG. 6, a client residing on a smartphone 600 may collect user-contributed data and transmit them to a server 602. The server 602 may include the following components: basic data analysis (BDA) 604, grid-based event localization (GEL) 606, and temporal analysis and location refinement (TALR) 608. BDA 604 may partition the area (or location) of interest into grid cells and perform preliminary data analysis to extract useful information—a swipe-cell indicator matrix and a cell confidence matrix. Such information may then be used by GEL 606 to locate event hotspots. TALR 608 may subsequently find swipe-hotspot correspondence based on the output of GEL 606, analyze the events' temporal properties, and perform an optimization-based location refinement. Subsequently, the server 602 may output the inferred event locations and occurrence time.

In the following, BDA 604, GEL 606, and TALR 608 are described in more detail. It is note that for ease of illustration, all the locations below are transformed to a local UTM coordinate system by subtracting the minimum values along respective axes.

BDA 604 may partition the area of interest into grid cells and perform analysis of collected data to generate useful information matrices—a swipe-cell indicator matrix and cell confidence matrix, which can be used by other components. Algorithm 1 below is an example algorithm that provides an overview of BDA 604.

---
Algorithm 1: Data Analysis
---
Input: User-swipes $S = \{s_i\}$, bounding rectangle of the area of interest R and grid size r.
Output: Swipe-cell indicator matrix I and cell confidence matrix W.
1. Initialization: I = 0; W = 0.
2. $\{c_i\}$ = GridPartitioning(R, r)
3. For I = 1 : |S| do
4.    $T_i$ = TrapezoidVertexComputing($s_i$)
5.    [I(I,:), $m_i$] = TrapezoidCellIntersection($T_i$, $\{c_j\}$)
6.    W = CellConfidenceUpdating(W, I(I, :)$^{2D}$, $m_i$)
7. end for
8. return I and W

---

Referring to grid partitioning at line 2 of the algorithm, this step partitions the area of interest R into grids each with r×r square meters in order to systematically analyze data and detect events. This results in $n_r \times n_c$ square cells, where $n_r$ and $n_c$ are the number of rows and columns respectively. Each cell $c_i$ is then represented using its centroid location. After partitioning R can be represented as $R=\{c_i\}$.

Now turning to line 4, in order to reflect the errors associated with GPS location and user-swiped angle, each swipe may be represented as a 2D polygon T, which has a high probability to cover the event location. It can be assumed that a user can only clearly observe an event within a maximum visible distance $d_m$ (it is application-dependent). Then the event's location can be in an area formed by shifting a circle centered at the user's GPS location l with radius a (GPS accuracy) along the user-swiped direction 8 with distance $d_m$. This shape can be bounded by a rectangle shown in dashed lines in the center of FIG. 7, which illustrates a diagram of an example trapezoid representation of a swipe.

Figure 7:
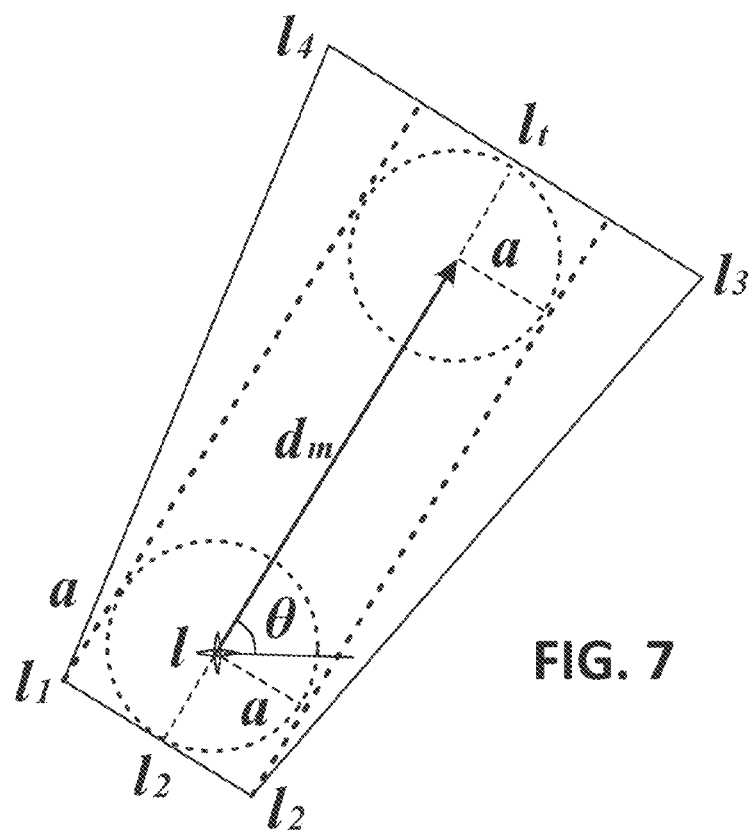
FIG. 7 is a diagram of an example trapezoid representation of a swipe.

To incorporate the angular errors from the phone compass and the user-swipe, $2\alpha$ may be added to the measured angle $\theta$. In other words, the event location can be in the angular range $[\theta-\alpha, \theta+\beta]$. $A=\pi/18$ (i.e., 10°) may be set. After incorporating $\alpha$, the resulting polygon T may be approximated as a trapezoid with vertices $l_{1:4}$ as shown in FIG. 7. The coordinates of these vertices are given in Table 1 below.

TABLE 1

Coordinates of a trapezoid's vertices, where $b = a + (d_m + 2a) \tan \alpha$ and $1 = (x, y)$ is the user's GPS location.

| loc | x-coordinate | y-coordinate |
|---|---|---|
| $l_b$ | $x_b = x + a\cos(\pi + \theta)$ | $y_b = y + a\sin(\pi + \theta)$ |
| $l_t$ | $x_t = x + (a + d_m)\cos\theta$ | $y_t = y + (a + d_m)\sin\theta$ |
| $l_1$ | $x_1 = x_b + a\cos\left(\frac{\pi}{2} + \theta\right)$ | $y_1 = y_b + a\sin\left(\frac{\pi}{2} + \theta\right)$ |
| $l_2$ | $x_2 = x_b + a\cos\left(\frac{3\pi}{2} + \theta\right)$ | $y_2 = y_b + a\sin\left(\frac{3\pi}{2} + \theta\right)$ |
| $l_3$ | $x_3 = x_t + b\cos\left(\frac{3\pi}{2} + \theta\right)$ | $y_3 = y_t + b\sin\left(\frac{3\pi}{2} + \theta\right)$ |
| $l_4$ | $x_4 = x_t + b\cos\left(\frac{\pi}{2} + \theta\right)$ | $y_4 = y_t + b\sin\left(\frac{\pi}{2} + \theta\right)$ |

Figure 8:
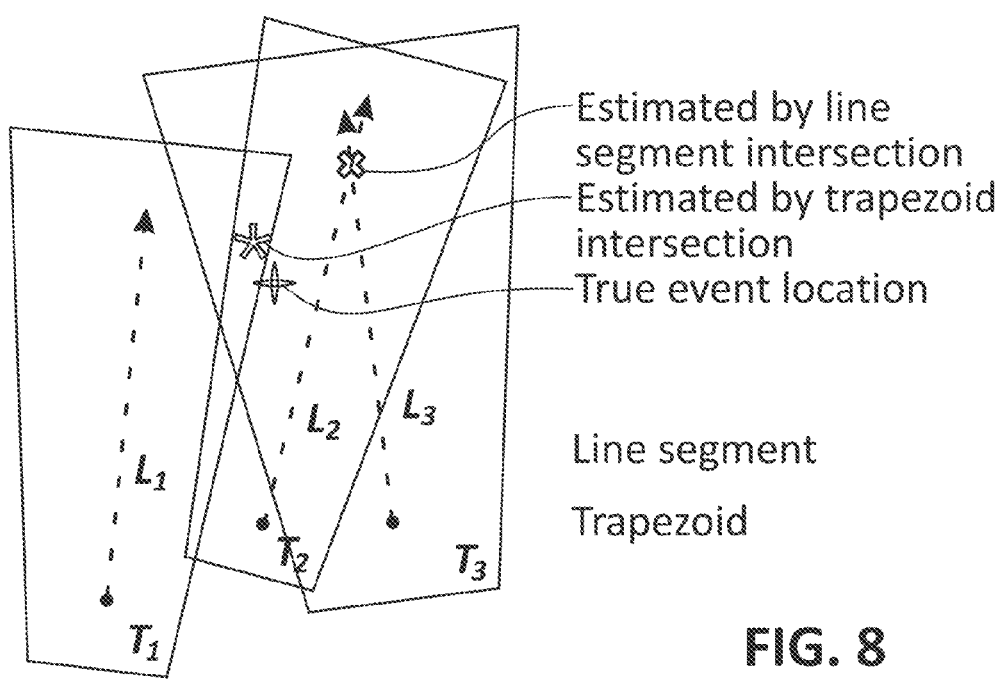
FIG. 8 depicts three swipes with both trapezoid ($T_{1:3}$) and line segment representation ($L_{1:3}$)

Besides the trapezoid representation, an alternative is to represent each swipe as a directed line segment with a maximum visible distance $d_m$. FIG. 8 illustrates three swipes with both trapezoid ($T_{1:3}$) and line segment representation ($L_{1:3}$). As can be seen, trapezoid representation considers the uncertainty in the measurements and thus can have a high probability to cover the true event location as well as to intersect with each other. Their area of intersection provides a reasonable estimation of the true event location. In contrast, due to large GPS and angular errors, limited line segments usually result in low-quality intersections. In FIG. 8, $L_1$ becomes useless and three line segments produce only one intersection which becomes the estimated event location. If line intersection (without the maximum visible distance constraint) is allowed, an even worse result can be produced.

Now turning to line 4 of the algorithm, intersecting all the trapezoids $T_i$ may be used to find the possible event locations. To achieve this, computational geometry techniques such as convex polygon intersection may be used. Moreover, all the trapezoids need to be kept in order to intersect with newly arrived ones.

Figure 9:
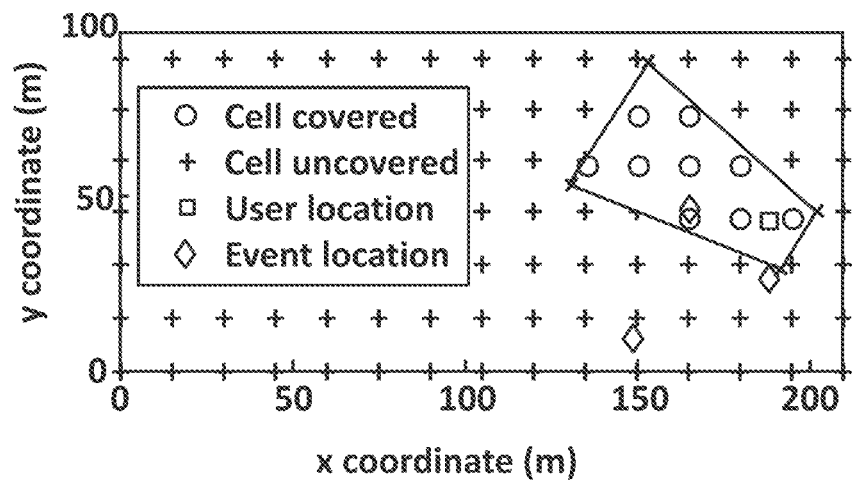
FIG. 9 is a graph of intersecting a trapezoid with cells.

One technique where each trapezoid can be processed independently and need not be stored after processing may be utilized. Towards this end, each trapezoid $T_i$ may be intersected with all the grid cells $c_j$. This may involve determining which cell centers are inside the trapezoid $T_i$. A ray casting algorithm may be used to achieve this goal. An example of intersection results is shown in FIG. 9, which illustrates a graph of intersecting a trapezoid with cells. It is assumed that there are altogether $n_s$ swipes. A swipe-cell indicator (SCI) matrix I may be created with $n_s$ rows and $n_r \times n_c$ columns to record the intersection results. If swipe I (trapezoid T) covers cell $c_j$, then the (i,j) entry of the matrix I is 1. Otherwise, it is 0. From each row of I, the cells that are covered by a given swipe can be examined; while from each column, swipes that contribute to a given cell can be examined. The latter is used to retrieve corresponding swipes for a detected event hotspot. Such swipe-hotspot correspondence can be important since it can enable temporal analysis and optimization-based localization. Each row of the SCI matrix can also be rewritten as an equivalent $n_r \times n_c$ matrix form, which is denoted as $I(i,:)^{2D}$. After each intersection, the number of $m_i$ of cells covered by trapezoid $T_i$ is also reported.

Now turning to line 6 of the algorithm, in order to reflect the confidence that a cell is to be a potential event hotspot, a confidence variable $w_k$ (initialized as 0) is created for each cell, and these variables are stored in an $n_r \times n_c$ cell confidence matrix W. If a trapezoid $T_i$ covers $m_i$ cells, then the confidence $w_k$ for each of these covered cells is updated as $w_k = w_k + 1/m_i$. This is because the size of a trapezoid is positively related to the errors in GPS and user-swiped angle. The larger a trapezoid is, the less reliable each covered cell is. The matrix W is updated until all the trapezoids are processed. Clearly, the size of W depends only on the size of the area of interest and the grid, but not the number of swipes. Processing on W is thus efficient and scalable, no matter how many swipes are contributed by crowds.

Figure 10A:
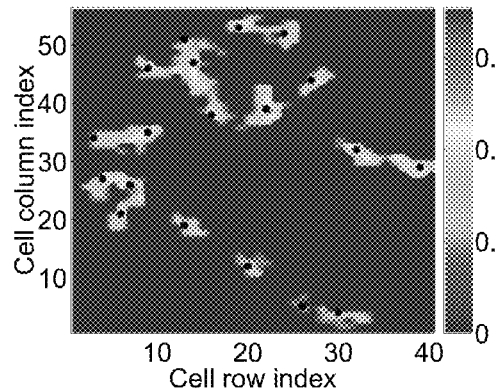
FIG. 10A depicts an original cell confidence map showing an example matrix W.

GEL 606 may be used to detect event hotspots based on the cell confidence matrix W generated by BDA 604. Intuitively, a hotspot should have locally high confidence over neighboring cells. GEL 606 may treat W as an image, with each cell as a pixel and the cell confidence as (scaled) image intensity. FIG. 10A illustrates an original cell confidence map showing an example matrix W. W is termed as the cell confidence map. Example algorithm 2 below provides an overview of GEL 606.

---

Algorithm 2: Grid-based Event Localization

Input: Cell confidence matrix W and confidence threshold $thre_c$.
Output: Estimated event locations $\epsilon^g$.
1. Initialization: $\epsilon^g = \emptyset$
2. $W^f$ = MapFiltering(W, $thre_c$).
3. G = ConnectedComponentDetection($W^f$)
4. for i = 1 |G| do
5.   [$b_i$, $ind_i$] = LocalMaxDetection&Planning($G_i$)
6.   if $ind_i$ = 0 then
7.     $B_i$ = CellofMaxConfidence($G_i$)
8.   end if
9.   $e_i^g$ = CellofMaxConfidence($G_i$)
10.   $\epsilon^g = \epsilon^g \cup \{e_i^g\}$
11. end for
12. return $\epsilon^g$

---

In line 2 of Algorithm 2, unreliable cells may be filtered out having confidences below a threshold three (set to 0.25 max(W)). This filtering process can also partition the large connected map into several small connected components, each of which would contain at least one event hotspot.

Turning to line 3 of Algorithm 2, a flood-fill algorithm may be used to detect the connected components G on the filtered confidence map $W^f$.

Figure 10B:
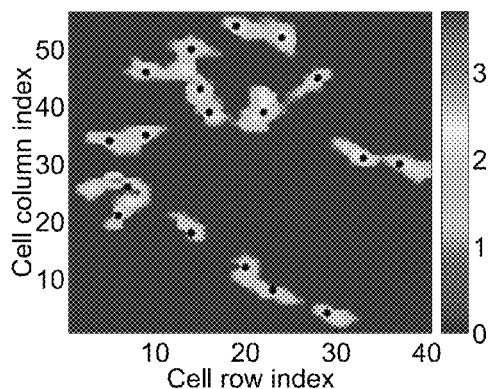
FIG. 10B depicts a filtered confidence map with estimated hotspots.

Turning to lines 4-11 of Algorithm 2, to pinpoint event locations from each connected component, GEL 606 may perform 2D local maximum detection since intuitively an event hotspot should have locally high confidence over neighboring cells. If a group of local maximums are within $2\sqrt{2}$ (Euclidean distance on pixels) to each other, only the one with the maximum confidence is retained to reduce false alarms. The weighted center of these local maximums may be used as the detected event location, but it may actually introduce even larger errors since false alarms are not trustable. Local maximums can be pruned because it may be difficult to differentiate very close locations due to GPS and angular errors. If not local maximum $b_i$ is detected ($ind_i$=0), GEL 606 chooses the cell with the maximum confidence of the connected component as the event location. If multiple cells satisfy this condition, GEL 606 chooses the one closest to the component center. The size of a connected component and the number of event locations detected also provide certain insights about whether there are missed hotspots of false alarms. Since these locations are detected on an image, they are pixel (cell) indices. Those indices can be mapped to the corresponding geolocations. All these estimated locations $e_i^g$ can be inserted into a set $\mathcal{E}^{qg}$. An example of estimated hotspots on the filtered confidence map is shown in FIG. 10B, illustrates a filtered confidence map with estimated hotspots (denoted as black stars).

A function of TALR 608 is to obtain swipe-hotspot correspondence leveraging the estimated event locations $\mathcal{E}^{qg}$ from GEL 606 and the SCI matrix from BDA 604. Based on such correspondence, TALR 608 can perform temporal analysis and optimization-based localization for each hotspot. Algorithm 3 below provides a formal description of TALR 608, which includes the following steps:

---

Input: User swipes S, estimated event locations $\epsilon^g = \{e_i^g\}$ and swipe-cell indicator matrix I.
Output: Event occurrence intervals I and optimized event locations $\epsilon^o$.
1. Initialization: $\epsilon^o = \emptyset$
2. for I = 1 : $|\epsilon^g|$ do
3.   $H_i$ = SwipeRetrieval($e_i^g$, I, S)
4.   $H_i^c$ = HierarchicalClustering($H_i$)
5. end for
6. $\{H_i^r\}$ = ClusterRefinement($\{H_i^c\}$)
7. for i = 1 $|\epsilon^g|$ do
8.   $I_i$ = TemporalAnalysis($\{H_i^c\}$)
9.   if NumOfSwipe($H_i^r$) ≥ 3 & STD(Angle($H_i^r$)) ≥ 0.2 then
10.     $e_i^o$ = OptimizeLocation($H_i^r$)
11.   else
12.     $e_i^o = e_i^g$
13.   end if
14.   $\epsilon^o = \epsilon^o \cup \{e_i^o\}$
15. end for
16. return I and $\epsilon^o$

---

Referring to line 3 of Algorithm 3, this step is to retrieve the set of swipes $H_i$ to a given estimated hotspot $e_i^g$ by examining the corresponding column of the SCI matrix.

Turning to line 4 of Algorithm 4, this step is to purify $H_i$ (filter out certain erroneous associations from nearby hotspots) and find a smaller set $H_i^c$ whose elements correspond to the same hotspot with high probability. To achieve this, a hierarchical clustering in the temporal domain may be performed. This is motivated by the observation that users observed the same event or consecutive events at a hotspot (confined location) should respond closely in terms of time. Moreover, for events repeatedly happened during certain intervals over days, those user-swipes may also be close in term of time-of-day (but on different days).

An agglomerative hierarchical clustering approach may be applied which does not need to predefine the number of clusters and is also more robust to outliers compared with flat k-means clustering. Time may be represented in minutes. The absolute different may be used as the distance metric and shortest distance as the linkage function (measuring the distance between clusters). Finally, a predefined cutoff distance (set to 10, but may be application-dependent) may be used on the linkage function to cut the hierarchical clustering tree. All the objects may be assigned below each cut to a single cluster. Each valid cluster may be required to contain at least 3 members. Note that an event hotspot may have multiple temporal clusters. Performing temporal clustering before localization can result in only a few large clusters containing swipes to multiple event hotspots, since events can happen near-continuously over the whole area of interest.

Turning now to line 6 of Algorithm 3, since hierarchical clustering is performed for each hotspot, each swipe can possibly be assigned to multiple clusters. If this happens, a swipe may be assigned to the cluster with the largest number of members. This is to ensure that each swipe is assigned to only one cluster and thus only one hotspot. The refined clusters are denoted as $\{H_i^c\}$.

At line 8 of Algorithm 3, clusters of time epochs may be helpful in investigating the temporal properties at a hotspot.

Figure 11:
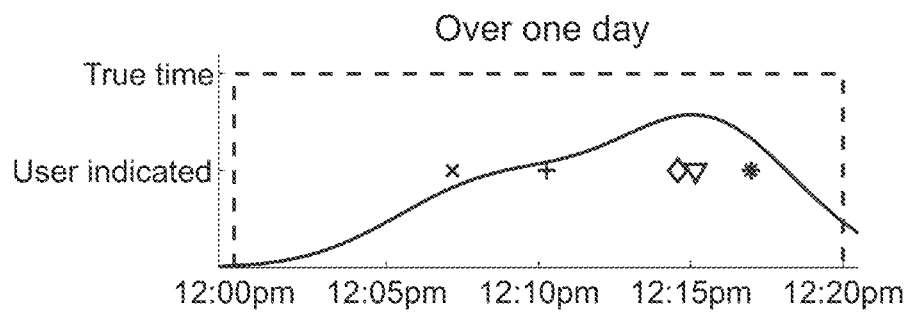
FIG. 11 illustrates graphs showing an example of using the range of the temporal cluster from user-swipes to estimate the event occurrence interval.
Figure 11:
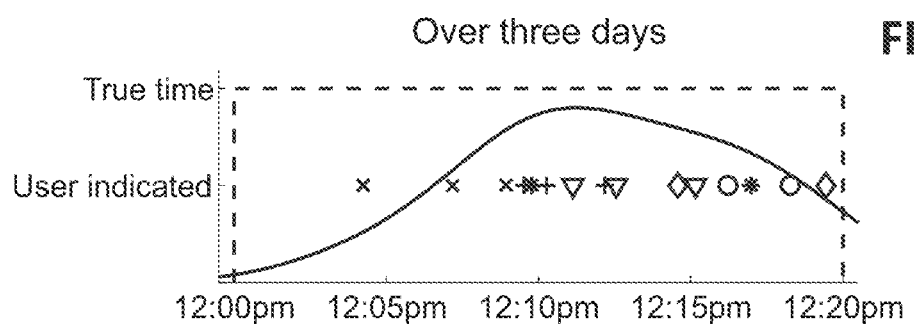

FIG. 11 illustrates graphs showing an example of using the range of the temporal cluster from user-swipes to estimate the event occurrence interval (e.g., events happened between 12:07-12:17 pm in one day from the top graph). Different symbols in FIG. 11 denote data from different users. The curves show the kernel density estimation. The histogram or kernel density estimation may be used to estimate when an event with high probability can be observed. As more swipes are aggregated, the temporal properties at a hotspot become clearer. By examining such properties over different snapshots, it can be investigated how the temporal patterns change at a hotspot.

Referring now to lines 9-12 of Algorithm 3, swipes in the refined clusters are forwarded to the optimization engine. Optimization-based localization usually generates superior performance, but it may not be necessary or efficient when there are too few swipes and/or the user-indicated angles are similar. First, it may be checked whether the number of inputs is greater than 3 and the standard deviation of the associated angles is larger than 0.2. Otherwise, optimization will not be activated.

The optimization problem may be formulated as follows:

$$\min_{x^t, y^t, x_i^t, y_i^t, \epsilon_i} \gamma \sum_i |\epsilon_i| + \sum_i w_i(|x_i^t - x_i| + |y_i^t - y_i|)$$
$$\text{s.t.} \quad (y^t - y_i^t)\cos\theta_i = (x^t - x_i^t)\sin\theta_i + \epsilon_i, \forall i.$$

In the above problem, $(x_i^t, y_i^t)$ and $(x^t, y^t)$ denote the true user and hotspot locations respectively and these values are to be optimized. $(x^t, y^t)$, i.e., $l_i$, and $\theta_i$ are the user's GPS locations and swiped-angles respectively, which are known. The constraint is just an alternative expression of $\tan\theta_i = (y^t - y_i^t)/(x^t - x_i^t)$ (which should be valid at the true locations) plus an error term $\mathcal{E}^g{}_i$. The first sum in the objective function is to penalize the error $\epsilon_i$ in the constraint. The second sum can be interpreted as to move the users' GPS locations to their true locations as little as possible such that these swipes intersect at the same target location (satisfying the constraints). Moreover, those movements are weighted by their corresponding GPS accuracy, i.e., $w_i=1/a_i$, which means that the more accurate a user's GPS location, the less the movement should be. In order to be robust, the $l_1$ norm (sum of absolute values) in the objective function. The variable γ is positive and used to balance the emphasis on the dual objectives. Γ=1 was found empirically to be a good setting. A refined location may denoted as $e^o=[x^t, y^t]$ and inserted into a location set $\mathcal{E}^{g\,o}$. This location algorithm is termed herein as optimization-based location refinement (OLR). Note that OLR does not refine directly on the locations estimated by GEL, but uses the swipe-hotspot correspondence inferred from GEL and temporal clustering.

Figure 12A:
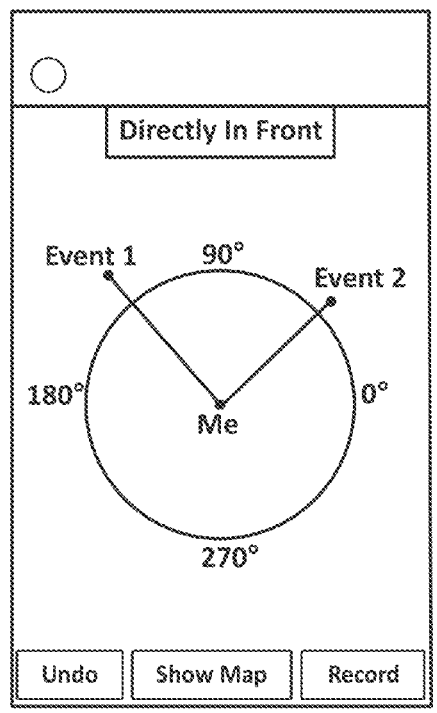
FIG. 12A illustrates screenshots of user swipes on the smartphone's touchscreen to indicate the directions of events.
Figure 12B:
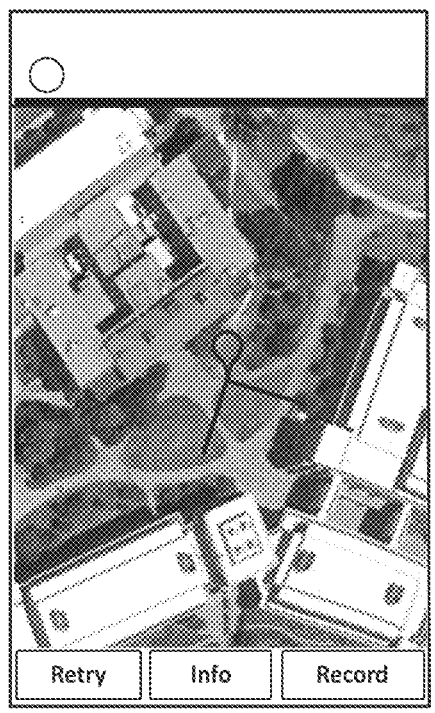
FIG. 12B illustrates a user location (pin) and the swiped directions (lines) on a map for presenting the user with instant visual feedback.

In accordance with embodiments, a smartphone application may be implemented in two parts, a smartphone client and a back-end server application. The client was built and tested on an Android smartphone platform. A user swipes on the smartphone touchscreen to the directions that he or she sees events. Arrows are then drawn correspondingly. If the user is facing an event, he or she can just press the "Directly in Front" button. After submitting data, the user is asked to choose the event type from a predefined list or to enter short tags (optional). The user can also view his or her current location and the directions she or he points to on a digital map. Screenshots of an example user interface are shown in FIGS. 12A and 12B. FIG. 12A illustrates screenshots of user swipes on the smartphone's touchscreen to indicate the directions of events. FIG. 12B illustrates a user location (pin) and the swiped directions (lines) on a map for presenting the user with instant visual feedback.

Simple calculation of the swiped-angle and acceptance of a swipe (by examining the accelerations) are done on the smartphone. Then data including device ID (its usage will be discussed in further detail herein), time stamp, GPS location and accuracy, compass reading, and swiped-angle, may be uploaded to a server for processing via Matlab.

A controlled experiment was designed in order to conveniently collect the ground trust (location and time) to evaluate the system performance. Six persons assisted with smartphone testing. After interviewing them, it was discovered that they all go to a common restaurant area for lunch from respective buildings at around noon. The area covering their workplaces and restaurants is about 400×550 m². 20 red flags were manually put up and removed at different locations during different time intervals to mimic events starting and ending along the volunteers' way to and from the restaurants in daily life. The distance between an event location to its nearest neighbor ranged from 40.4 m to 81.6 m, with a mean of 53.4 m. The size of the red flag was chosen to reflect the equivalence between clearly observing a red flag and a human being. Where and when to put up and remove these flags were controlled and recorded. At any time epoch, at most 10 flags would appear simultaneously. The experiment was conducted over 6 days. Each red flag appeared for 20 minutes, whereas it took about 15 minutes for a volunteer to walk to and from the restaurant. That is to say, if there was more than a 5-minute difference between the time that events started and the time that a volunteer started off, that volunteer may observe only a subset of events.

Each volunteer was provided an Android smartphone. These phones include three Google Nexus S phones and three Samsung Galaxy S3 phones to reflect the heterogeneous hardware experienced in reality. Volunteers were asked to swipe to an event (red flag) when they observed it and were requested not to go to restaurants together in order to reflect the spatially and temporally distributed property of such crowd-sourcing behavior. From the collected data, it was found that, due to the temporal dynamics of red flags and the diversity among volunteers (in terms of their workplace locations, time for lunch, eyesight, and attention), each volunteer contributed 0.75 to 1.2 swipes to each event location per day. This showed that volunteers missed events, mistakenly found more events or swiped more than once to an event. At the end of the experiment, 682 swipes were received.

Besides the two localization algorithms, GEL and OLR, disclosed herein, a classical localization algorithm is also disclosed for comparison. This algorithm is referred to as line segment intersection and clustering (LIC), which is modified triangulation. It is to first find the intersections of all the line segments, then cluster those intersections, and finally use the cluster centers as the inferred event locations. A density-based clustering algorithm OP-TICS for LIC may be used, since it is robust to outliers and can detect regions with low density. The minimum number of points required to form a cluster was set to 3. The maximum visible distance is set to 45 m and the grid size 10 m.

The set of estimated and true event locations were denoted as $\mathcal{E}^g=\{e_i\}\in\mathbb{R}^2$ and $\mathcal{P}=\{p_j\}\in\mathbb{R}^2$, respectively. In order to evaluate the localization performance of the application, the following metrics were defined: reporting rate, detection rate, and localization error. The reporting rate is defined as the reporting rate $r_r$ as the ratio between the number of reported (estimated) and true event locations. A good event detection algorithm should result in an $r_r$ close to 1. $r_r<1$ and $r_r>1$ imply missed events and false alarms respectively.

Regarding detection rate, an event location $p_i$ is considered detected if there is an estimated location $e_j$ within $thre_d=25$ m. Detection rate $r_d$ is defined as the ratio between the number of detected and true event locations. $r_d$ is never larger than 1. An algorithm that reports every cell as an event location can result in an $r_d=1$ but an $r_r \gg 1$, implying lots of false alarms. Therefore, reporting rate and detection rate can be examined together to ensure that an algorithm functions well.

Regarding localization error, for each estimated event location $e_i$, its localization error may defined as the Euclidean distance to its nearest true event location, given by:

$$d(c_i, \mathcal{P}) = \min_j \|c_i - p_j\|_2.$$

It is noted that localization error is only calculated for reported locations. Missed event locations will not contribute to localization errors.

Association accuracy, which is defined as the percentage of hotspots with correctly associated swipes, may be used to evaluate the effectiveness of temporal clustering. Ground truth associations are obtained by examining both location and time. For assessing the performance of estimating the occurrence interval of events, the Jaccard similarity between the estimated interval A and the true interval B may be used as the performance measure which is defined as $$J(A, B) = \frac{|A \cap B|}{|A \cup B|}.$$

In experiments, the following questions were empirically addressed:
1. What are the advantages of GEL over LIC, since they have the same functionality in detecting event hotspots (while OLR is to optimize event locations after detection)?(FIGS. 13A-13C and FIGS. 14A-14C)
2. What are the reporting rates, detection rates, and localization errors of LIC, GEL, and OLR? (FIGS. 15A-15C)
3. How can temporal clustering improve swipe-hotspot correspondence? How can the estimated event occurrence interval approximate the true interval? (FIG. 16A-16C)

Initially, a qualitative comparison between GEL and LIC was performed to validate the necessity of GEL. FIGS. 13A-13C show examples when there are, on average, 5.5 swipes per event location. FIG. 13A shows the filtered cell confidence map with event locations estimated by GEL. FIG. 13B shows corresponding estimated event geolocations by GEL. FIG. 13C show estimated event geolocations by LIC. As can be seen, for a large portion of hotspots, there are either too few intersections (for relatively isolated locations) such that LIC is unaware of event locations (7 out of 20) or too many intersections (for locations with close neighbors) such that LIC mixes the swipes to different locations. In contrast, GEL performs much better and detects 17 out of 20 event locations.

Similar to FIGS. 13A-13C, FIGS. 14A-14C show examples when there are many more swipes (on average 34.1) per event location. For such a scenario, there are lots of intersections and those from nearby locations are mixed together to form several large connected areas. LIC thus cannot differentiate even distant locations and generate only a few large clusters, resulting in even worse performance than that in FIGS. 13A-13C. If the size of a cluster is confined, LIC can generate a reporting rate over 2, implying lots of false alarms. In contrast, GEL can still perform well. The only difference is that the values on the confidence map become much higher.

These results show that LIC suffers from low detection rate and is very sensitive to the number of swipes. In contrast, since GEL takes into account the GPC and angular errors, performs localization on cells rather than intersections, and also has a mechanism to convey confidence over cells, it shows the ability to quickly detect events when there are only limited swipes available and it is also relatively stable when many more swipes arrive.

Another advantage of GEL over LIC is in the convenience of retrieving swipes for each detected hotspot (for temporal analysis and location refinement). In order for LIC to retrieve swipes for each hotspot, it must record two kinds of information—which two swipes result in an intersection and which intersections are assigned to a cluster. Later, for each cluster, LIC needs to backtrack twice to find the corresponding swipes which is burdensome. Recall that when we need to retrieve the swipe-hotspot correspondence from GEL, only on column of the SCI matrix may be checked.

In terms of scalability, the number of intersections is on the order of $O(n_s^2)$ for LIC ($n_s$ is the number of swipes). While for GEL, the number of cells is fixed and independent of $n_s$. In other words, GEL is more scalable.

FIGS. 15A-15C show the average localization results when the swipes are cumulated over days. The standard deviations of the algorithms are found on similar orders and thus they are not plotted to make the figures uncluttered. Each point on the figure is calculated by averaging the results from $$\binom{6}{k}$$

combinations on each day's data, where k is the number of cumulative days. The number of average swipes per location is 5.7, 11.2, 16.8, 22.7, 28.3, and 34.1 for cumulative 1 to 6 days, respectively. In reality, it is possible that an event receives lots of swipes during a relatively short interval because of lots of observers.

First, the performance of the algorithms was examined when there are only limited swipes, i.e., during one day. As can be seen, LIC has much lower reporting rate and detection rate (below 0.6) than GEL and OLR (above 0.8), mainly due to the spare intersection problem with only limited swipes shown in FIGS. 13A-13C. OLR performs slightly worse than GEL in terms of detection rate, possibly due to the large errors contained in GPS locations, reported accuracy, user-indicated angles, and heterogeneous hardware. When there are only limited swipes, it is difficult for OLR to balance among them. GEL and OLR show improved localization accuracy compared with LIC, but the improvement is marginal. All the algorithms achieve a localization error around 13-14 m. When there are only limited swipes, the locations reports by LIC are with relatively compact intersections and thus of relatively high confidence. With much fewer but confident locations detected, LIC can achieve reasonable localization accuracy.

The performance of the algorithms was then examined when the number of swipes increases, i.e., accumulated over 2-6 days. It was observed that Gel and OLR perform well and are relatively stable in terms of reporting rate and detection rate (around 0.9), while the performance of LIC degrades as the number of swipes increases. The worst detection rate of LIC drops to about only 0.25. The localization accuracy of LIC also quickly degrades to over 25 m when accumulating 6 days' data. As more swipes arrive, intersections from neighboring hotspots mix together and form several large connected areas, LIC thus cannot accurately infer many hotspots (FIGS. 14A-14C). On the other hand, GEL and OLR can benefit from the increased number of swipes and their localization accuracy improves to around 10 m accumulating 6 days' data. OLR results in even smaller average location errors than GEL after 4 cumulative days, showing that a reasonable number of swipes is needed for OLR to be effective.

FIG. 16A plots the association accuracy before and after temporal clustering for cumulative days. It is clear that temporal clustering can effectively improve the association accuracy, i.e., refine the swipe-hotspot correspondence, from around 60% to 90%. Association error occurs if a large portion of the swipes to a hotspot have been erroneously associated with nearby hotspots before clustering due to large GPS and angular errors. FIG. 16B shows the cumulative distribution of the Jaccard similarity between the estimated and true event occurrence interval. It can be seen that as more swipes arrive, on average the Jaccard similarity increases, but the extent of improvement gradually levels off. Cumulating 1, 3, and 5 days' data can capture on average 40%, 50%, and 54% of the true occurrence interval. More swipes can introduce errors as well since erroneous temporal clusters can increase the denominator of the Jaccard similarity and decrease its value. FIG. 16C plots the mean and standard deviation (STD) of Jaccard similarity versus the number of swipes per hotspot (obtained from the inferred swipe-hotspot correspondence). It shows that on average 3-5 swipes can capture around 40% of the occurrence interval of a 20-minute event and 34-37 swipes are needed to capture over 70% of the occurrence interval, due to the temporal randomness of user-contributed swipes. Nevertheless, clusters of time associated with swipes provide us insights about the temporal properties of events.

As a crowdsourced system, the system may receive numerous swipes and detect numerous hotspots. The system may be used to identify a smaller set of public-minded users and hotspots with public concerns in order to present the most useful information to querying users. To achieve this, a user-hotspot indicator matrix U can be constructed for recording which user pointed out which hotspot. This can be done by first forming a swipe-hotspot indicator matrix from the inferred correspondence and then performing an OR operation on the swipes corresponding to the same user (each swipe was tagged with a user ID when submitted). A possible choice for inferring high-quality users and hotspots from U is to use the hypertext induced search (HITS) model which has been successfully applied in web page ranking and interesting location mining. Note that such rankings can change depending on the region and time of interest.

Based on the type of event and a geo-information database, an estimated hotspot may be rectified to its closest semantically meaningful location. For example, smokers may be more likely to smoke around the entrance of a building rather than in the middle of a road. Moreover, since a human being cannot see through a building, the maximum visible distance can be adjusted for each swipe such that it touches the building contour at most.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flow chart illustrations and/or block diagrams of methods, apparatus (systems), and computer program products according to embodiments of the subject matter. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart and block diagrams in the Figures illustrate the architecture, functionality, and operation of possible implementations of systems, methods, and computer program products according to various embodiments of the present subject matter. In this regard, each block in the flow chart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration, and combinations of blocks in the block diagrams and/or flow chart illustration, can be implemented by special purpose hardware-based systems that perform the specified functions or acts or carry out combinations of special purpose hardware and computer instructions.

Any patents or publications mentioned in this specification are indicative of the levels of those skilled in the art to which the present subject matter pertains. These patents and publications are herein incorporated by reference to the same extent as if each individual publication was specifically and individually indicated to be incorporated by reference.

One skilled in the art will readily appreciate that the present subject matter is well adapted to carry out the objects and obtain the ends and advantages mentioned, as well as those inherent therein. The present examples along with the methods described herein are presently representative of various embodiments, are exemplary, and are not intended as limitations on the scope of the present subject matter. Changes therein and other uses will occur to those skilled in the art which are encompassed within the spirit of the present subject matter as defined by the scope of the claims.

What is claimed:

1. A method comprising:
    determining a geographic position and orientation of a computing device;
    receiving a touch gesture on a touchscreen display of the computing device to indicate a direction towards and distance to a location of an object or event from the computing device;
    determining the direction towards and distance to the location based on the touch gesture on the touchscreen display and the orientation of the computing device; and
    defining a geographic position of the location based on the geographic position of the computing device and the determined direction and distance.

2. The method of claim 1, wherein determining a geographic position of a computing device comprises using one of a satellite positioning system, a smartphone sensor, a wireless communication system, a cellular system, and radio frequency (RF) signals for determining the geographic position of the computing device.

3. The method of claim 1, wherein the touch gesture includes a finger swipe on a smartphone display, and
    wherein the method further comprises:
        determining a direction of the swipe with respect to an orientation of the computing device; and
        determining the direction of the object or event based on the orientation of the computing device and the direction of the swipe.

4. The method of claim 1, further comprising receiving user input specifying information about the object or event.

5. The method of claim 4, further comprising communicating, to another computing device, information and data associated with the user gesture and the geographic position of the computing device.

6. The method of claim 5, further comprising:
    determining a time of receipt of the touch gesture; and
    communicating the time to the other computing device.

7. The method of claim 4, wherein the information comprises a name of one of the object and the event at the location.

8. The method of claim 1, further comprising:
    maintaining a geographic map including the location; and
    specifying an address of the location based on the geographic position of the computing device and the touch gesture.

9. The method of claim 8, further comprising associating one of the object and the event with the location.

10. The method of claim 1, further comprising:
    determining information associated with the defined geographic position of the location; and
    communicating the determined information to another computing device.

11. A method comprising:
  receiving, from one or more computing devices, data comprising a geographic positions of the one or more computing devices and user gesture input on one or more touchscreen displays of the one or more computing devices to indicate a direction towards and distance to a location from the respective computing device; and
  determining a geographic position of the location based on the data from the one or more computing devices.

12. The method of claim 11, wherein the geographic position of the respective computing device is satellite positioning coordinates.

13. The method of claim 11, further comprising receiving, from each of the computing devices, user input that specifies information about the location.

14. The method of claim 13, wherein the information comprises a name of one of an object and an event at the location.

15. The method of claim 11, further comprising receiving, from each of the computing devices, a time of receipt of the touch gesture.

16. The method of claim 11, further comprising:
  maintaining a geographic map including the location; and
  specifying an address of the location based on the determined geographic position of the location.

17. The method of claim 16, further comprising associating one of an object and an event with the location.

18. A system comprising:
  at least one processor and memory configured to:
  determine a geographic position and orientation of a computing device;
  receive a touch gesture on a touchscreen display of the computing device to indicate a direction towards and distance to a location of an object or event from the computing device;
  determine the direction towards and distance to the location based on the touch gesture on the touchscreen display and the orientation of the computing device; and
  define a geographic position of the location based on the geographic position of the computing device and the determined direction and distance.

19. The system of claim 18, wherein the at least one processor and memory are configured to use satellite positioning coordinates for determining the geographic position of the computing device.

20. The system of claim 18, wherein the touch gesture is a swipe on a display of the computing device, and
  wherein the at least one processor and memory are configured to:
  determine a direction of the swipe with respect to an orientation of the computing device; and
  determine the direction towards the location based on the orientation of the computing device and the direction of the swipe.

21. The system of claim 18, wherein the at least one processor and memory are configured to receive user input specifying information about the location.

22. The system of claim 21, wherein the at least one processor and memory are configured to communicate, to another computing device, information and data associated with the touch gesture and the geographic position of the computing device.

23. The system of claim 22, wherein the at least one processor and memory are configured to:
  determine a time of receipt of the touch gesture; and
  communicate the time to the other computing device.

24. The system of claim 21, wherein the information comprises a name of one of an object and an event at the location.

25. The system of claim 18, wherein the at least one processor and memory are configured to:
  maintain a geographic map including the location; and
  specify an address of the location based on the geographic position of the computing device and the touch gesture.

26. The system of claim 25, wherein the at least one processor and memory are configured to associate one of an object and an event with the location.

27. A system comprising:
  at least one processor and memory configured to:
  receive, from each of a plurality of computing devices, data comprising a geographic position of the respective computing device and a touch gesture input to indicate a direction towards and a distance to a location of an object or event from the respective computing device;
  determine directions and distances toward the location based on the touch gesture on the touchscreen display and the orientation of the computing device of each of the computing devices; and
  determine a geographic position of the location based on the directions and distances from each of the computing devices.

28. The system of claim 27, wherein the geographic position of the respective computing device is satellite positioning coordinates.

29. The system of claim 27, wherein the at least one processor and memory are configured to receive, from each of the computing devices, user input that specifies information about the location.

30. The system of claim 29, wherein the information comprises a name of one of an object and an event at the location.

31. The system of claim 27, further comprising receiving, from each of the computing devices, a time of receipt of the touch gesture.

32. The system of claim 27, wherein the at least one processor and memory are configured to:
  maintain a geographic map including the location; and
  specify an address of the location based on the determined geographic position of the location.

33. The system of claim 32, wherein the at least one processor and memory are configured to associate one of an object and an event with the location.

* * * * *